(12) United States Patent
Medalsy et al.

(10) Patent No.: US 11,220,055 B2
(45) Date of Patent: Jan. 11, 2022

(54) THREE-DIMENSIONAL PRINTING SYSTEM

(71) Applicant: NEXA3D INC., Ventura, CA (US)

(72) Inventors: Izhar Medalsy, Ventura, CA (US);
Luciano Tringali, Rome (IT); Nathan Barker, Santa Barbara, CA (US); Steve Barker, Dayton, OH (US)

(73) Assignee: NEXA3D INC., Ventura, CA (US)

( * ) Notice: Subject to any disclaimer, the term of this patent is extended or adjusted under 35 U.S.C. 154(b) by 153 days.

(21) Appl. No.: 16/676,940

(22) Filed: Nov. 7, 2019

(65) Prior Publication Data
US 2020/0147881 A1 May 14, 2020

Related U.S. Application Data

(60) Provisional application No. 62/758,413, filed on Nov. 9, 2018.

(51) Int. Cl.
*B33Y 30/00* (2015.01)
*B29C 64/255* (2017.01)
(Continued)

(52) U.S. Cl.
CPC .......... *B29C 64/307* (2017.08); *B29C 64/255* (2017.08); *B29C 64/277* (2017.08); *B33Y 30/00* (2014.12); *B33Y 40/00* (2014.12)

(58) Field of Classification Search
None
See application file for complete search history.

(56) References Cited

U.S. PATENT DOCUMENTS 5,122,441 A 6/1992 Lawton et al.
5,248,249 A 9/1993 Yamamoto et al.
(Continued)

FOREIGN PATENT DOCUMENTS

CN 107336438 A 11/2017
CN 206840705 U 1/2018
(Continued)

OTHER PUBLICATIONS

Non-Final Office Action dated Jan. 21, 2021, from U.S. Appl. No. 16/373,449 (filed Apr. 2, 2019), 11 pgs.
(Continued)

*Primary Examiner* — Matthew J Daniels
*Assistant Examiner* — Paul Spiel
(74) *Attorney, Agent, or Firm* — Ascenda Law Group, PC

(57) ABSTRACT

A vat polymerization apparatus configured with a resin circulatory system that includes pumps arranged to extract used photo-curing resin from a tank and refresh or replace it with new resin, another fluid, or a combination of new resin and the fluid. Resin flow is regulated using a plurality of valves which are opened and closed to achieve a desired circulation process. Additional aspects of the apparatus include a membrane assembly in which a radiation-transparent flexible membrane is supported in a frame that stretches the membrane. A lip of the frame is secured to a bottom rim of the tank; thus, when the membrane assembly is in place it forms a bottom of the tank. A tension adjustment mechanism may be employed to adjust the tension of the membrane within the frame. The frame may be aligned with the tank with the aid of magnetized alignment aids distributed about the frame.

20 Claims, 28 Drawing Sheets

(51) Int. Cl.
 *B29C 64/277* (2017.01)
 *B29C 64/307* (2017.01)
 *B33Y 40/00* (2020.01)

(56) References Cited

U.S. PATENT DOCUMENTS

| | | |
|---|---|---|
| 5,340,433 A | 8/1994 | Crump |
| 5,426,722 A | 6/1995 | Batchelder |
| 5,491,643 A | 2/1996 | Batchelder |
| 5,503,785 A | 4/1996 | Crump et al. |
| 5,587,913 A | 12/1996 | Abrams et al. |
| 5,625,495 A | 4/1997 | Moskovich |
| 5,653,925 A | 8/1997 | Batchelder |
| 5,764,521 A | 6/1998 | Batchelder et al. |
| 5,900,207 A | 5/1999 | Danforth et al. |
| 6,028,410 A | 2/2000 | Leavitt et al. |
| 6,054,077 A | 4/2000 | Comb et al. |
| 6,067,480 A | 5/2000 | Stuffle et al. |
| 6,085,957 A | 7/2000 | Zinniel et al. |
| 6,238,613 B1 | 5/2001 | Batchelder et al. |
| 6,367,791 B1 | 4/2002 | Calderon et al. |
| 6,437,034 B2 | 8/2002 | Lombardi et al. |
| 6,547,995 B1 | 4/2003 | Comb |
| 6,578,596 B1 | 6/2003 | Batchelder et al. |
| 6,629,011 B1 | 9/2003 | Calderon et al. |
| 6,685,866 B2 | 2/2004 | Swanson et al. |
| 6,749,414 B1 | 6/2004 | Hanson et al. |
| 6,790,403 B1 | 9/2004 | Priedeman, Jr. et al. |
| D514,913 S | 2/2006 | Dunn et al. |
| 7,063,285 B1 | 6/2006 | Turley et al. |
| 7,255,821 B2 | 8/2007 | Priedeman, Jr. et al. |
| 7,297,304 B2 | 11/2007 | Swanson et al. |
| 7,534,386 B2 | 5/2009 | Priedeman, Jr. |
| 7,896,209 B2 | 3/2011 | Batchelder et al. |
| 7,897,074 B2 | 3/2011 | Batchelder et al. |
| 7,910,041 B1 | 3/2011 | Priedeman, Jr. |
| 8,014,889 B2 | 9/2011 | Zinniel et al. |
| 8,033,811 B2 | 10/2011 | Swanson et al. |
| D650,787 S | 12/2011 | Taatjes et al. |
| 8,153,182 B2 | 4/2012 | Comb et al. |
| 8,153,183 B2 | 4/2012 | Skubic et al. |
| 8,155,775 B2 | 4/2012 | Batchelder |
| 8,157,202 B2 | 4/2012 | Taatjes et al. |
| D663,191 S | 7/2012 | Taatjes et al. |
| 8,215,371 B2 | 7/2012 | Batchelder |
| 8,221,858 B2 | 7/2012 | Mannella et al. |
| 8,222,908 B2 | 7/2012 | Paul et al. |
| 8,227,540 B2 | 7/2012 | Priedeman et al. |
| 8,245,757 B2 | 8/2012 | Crump et al. |
| 8,287,959 B2 | 10/2012 | Batchelder |
| D673,605 S | 1/2013 | Johnson et al. |
| 8,419,996 B2 | 4/2013 | Swanson et al. |
| D682,490 S | 5/2013 | Goetzke et al. |
| 8,465,111 B2 | 6/2013 | Swanson et al. |
| 8,598,509 B2 | 12/2013 | Batchelder |
| 8,609,204 B2 | 12/2013 | Kritchman |
| 8,636,850 B2 | 1/2014 | Narovlyansky et al. |
| 8,663,533 B2 | 3/2014 | Swanson et al. |
| 8,663,568 B2 | 3/2014 | Bar Nathan et al. |
| 8,815,141 B2 | 8/2014 | Swanson et al. |
| 8,955,558 B2 | 2/2015 | Bosveld et al. |
| 8,961,167 B2 | 2/2015 | Swanson et al. |
| 8,974,715 B2 | 3/2015 | Hopkins et al. |
| 8,986,767 B2 | 3/2015 | Batchelder |
| 9,027,378 B2 | 5/2015 | Crump et al. |
| 9,050,753 B2 | 6/2015 | Rodgers et al. |
| 9,050,788 B2 | 6/2015 | Swanson et al. |
| D734,788 S | 7/2015 | Reches et al. |
| 9,073,263 B2 | 7/2015 | Mannella et al. |
| 9,090,428 B2 | 7/2015 | Batchelder et al. |
| 9,108,360 B2 | 8/2015 | Comb et al. |
| 9,141,015 B2 | 9/2015 | Hanson et al. |
| D741,149 S | 10/2015 | Koop et al. |
| 9,174,388 B2 | 11/2015 | Batchelder et al. |
| 9,174,389 B2 | 11/2015 | Swanson |
| 9,205,601 B2 | 12/2015 | Desimone et al. |
| 9,205,690 B2 | 12/2015 | Leavitt et al. |
| 9,215,882 B2 | 12/2015 | Zimmerman et al. |
| 9,233,506 B2 | 1/2016 | Leavitt |
| 9,238,329 B2 | 1/2016 | Swanson et al. |
| 9,321,609 B2 | 4/2016 | Koop et al. |
| 9,334,402 B2 | 5/2016 | Napadensky |
| 9,359,499 B2 | 6/2016 | Cernohous |
| 9,399,320 B2 | 7/2016 | Johnson et al. |
| 9,423,756 B2 | 8/2016 | Hanson et al. |
| 9,427,838 B2 | 8/2016 | Comb et al. |
| 9,483,588 B2 | 11/2016 | Nehme et al. |
| 9,511,547 B2 | 12/2016 | Swanson et al. |
| 9,523,934 B2 | 12/2016 | Orrock et al. |
| 9,527,247 B2 | 12/2016 | Dikovsky et al. |
| D777,251 S | 1/2017 | Reches et al. |
| 9,546,270 B2 | 1/2017 | Hirsch et al. |
| 9,550,327 B2 | 1/2017 | Swanson et al. |
| 10,328,634 B2 | 6/2019 | Zitelli et al. |
| 2009/0179355 A1 | 7/2009 | Wicker et al. |
| 2010/0140849 A1 | 6/2010 | Comb et al. |
| 2010/0161105 A1 | 6/2010 | Blake |
| 2011/0117268 A1 | 5/2011 | Batchelder et al. |
| 2012/0258190 A1 | 10/2012 | Batchelder et al. |
| 2013/0186549 A1 | 7/2013 | Comb et al. |
| 2013/0186558 A1 | 7/2013 | Comb et al. |
| 2013/0224423 A1 | 8/2013 | Mikulak et al. |
| 2013/0297063 A1 | 11/2013 | Kritchman et al. |
| 2014/0036455 A1 | 2/2014 | Napadensky |
| 2014/0052288 A1 | 2/2014 | El-Siblani et al. |
| 2014/0127524 A1 | 5/2014 | Batchelder et al. |
| 2014/0141166 A1 | 5/2014 | Rodgers |
| 2014/0265032 A1 | 9/2014 | Teicher et al. |
| 2014/0319716 A1 | 10/2014 | Shtilerman |
| 2014/0339720 A1 | 11/2014 | Menchik et al. |
| 2014/0358273 A1 | 12/2014 | LaBossiere et al. |
| 2015/0001750 A1 | 1/2015 | Kozlak et al. |
| 2015/0024317 A1 | 1/2015 | Orrock et al. |
| 2015/0028523 A1 | 1/2015 | Jaker et al. |
| 2015/0037587 A1 | 2/2015 | Sella |
| 2015/0076739 A1 | 3/2015 | Batchelder |
| 2015/0084239 A1 | 3/2015 | Batchelder et al. |
| 2015/0097053 A1 | 4/2015 | Batchelder et al. |
| 2015/0097307 A1 | 4/2015 | Batchelder et al. |
| 2015/0097308 A1 | 4/2015 | Batchelder et al. |
| 2015/0145171 A1 | 5/2015 | Walker et al. |
| 2015/0145174 A1 | 5/2015 | Comb |
| 2015/0148931 A1 | 5/2015 | Heide |
| 2015/0152217 A1 | 6/2015 | Cernohous et al. |
| 2015/0158691 A1 | 6/2015 | Mannella et al. |
| 2015/0209836 A1 | 7/2015 | Dunn et al. |
| 2015/0210010 A1 | 7/2015 | Napadensky |
| 2015/0224709 A1 | 8/2015 | Napadensky |
| 2015/0224710 A1 | 8/2015 | El-Siblani |
| 2015/0224714 A1 | 8/2015 | Swanson et al. |
| 2015/0224717 A1 | 8/2015 | Kritchman |
| 2015/0251353 A1 | 9/2015 | Rodgers et al. |
| 2015/0251356 A1 | 9/2015 | Batchelder |
| 2015/0252190 A1 | 9/2015 | Rodgers et al. |
| 2015/0259530 A1 | 9/2015 | Rodgers et al. |
| 2015/0266236 A1 | 9/2015 | Farah et al. |
| 2015/0266241 A1 | 9/2015 | Batchelder |
| 2015/0266242 A1 | 9/2015 | Comb et al. |
| 2015/0273582 A1 | 10/2015 | Crump et al. |
| 2015/0273767 A1 | 10/2015 | Batchelder et al. |
| 2015/0352788 A1 | 12/2015 | Livingston et al. |
| 2015/0360417 A1 | 12/2015 | Kritchman et al. |
| 2016/0009027 A1 | 1/2016 | Martin |
| 2016/0023373 A1 | 1/2016 | Demuth et al. |
| 2016/0033756 A1 | 2/2016 | Miller |
| 2016/0039120 A1 | 2/2016 | Dikovsky et al. |
| 2016/0039146 A1 | 2/2016 | Swanson et al. |
| 2016/0039147 A1 | 2/2016 | Crump et al. |
| 2016/0046072 A1 | 2/2016 | Rolland et al. |
| 2016/0046075 A1 | 2/2016 | DeSimone et al. |
| 2016/0046080 A1 | 2/2016 | Thomas et al. |
| 2016/0052205 A1 | 2/2016 | FrantzDale |
| 2016/0082655 A1 | 3/2016 | Castanon et al. |
| 2016/0107383 A1 | 4/2016 | Dikovsky et al. |

(56) References Cited

U.S. PATENT DOCUMENTS

| | | | |
|---|---|---|---|
| 2016/0114535 A1 | 4/2016 | Kritchman et al. | |
| 2016/0122541 A1 | 5/2016 | Jaker et al. | |
| 2016/0129645 A1 | 5/2016 | Wighton et al. | |
| 2016/0136890 A1 | 5/2016 | Castanon et al. | |
| 2016/0161872 A1 | 6/2016 | Orrock et al. | |
| 2016/0167313 A1 | 6/2016 | Swanson et al. | |
| 2016/0176120 A1 | 6/2016 | Skubic et al. | |
| 2016/0193786 A1 | 7/2016 | Moore et al. | |
| 2016/0193791 A1 | 7/2016 | Swanson et al. | |
| 2016/0200052 A1 | 7/2016 | Moore et al. | |
| 2016/0229123 A1 | 8/2016 | Carlson et al. | |
| 2016/0236421 A1 | 8/2016 | Mannella et al. | |
| 2016/0236899 A1 | 8/2016 | Beery et al. | |
| 2016/0250810 A1 | 9/2016 | Lynch August et al. | |
| 2016/0251486 A1 | 9/2016 | Cernohous et al. | |
| 2016/0257033 A1 | 9/2016 | Jayanti et al. | |
| 2016/0263830 A1 | 9/2016 | Batchelder et al. | |
| 2016/0263837 A1 | 9/2016 | Goldman et al. | |
| 2016/0303793 A1 | 10/2016 | Ermoshkin et al. | |
| 2016/0303795 A1* | 10/2016 | Liu | B29C 64/25 |
| 2016/0311158 A1 | 10/2016 | DeSimone et al. | |
| 2016/0325493 A1 | 11/2016 | DeSimone et al. | |
| 2016/0339643 A1 | 11/2016 | Dikovsky et al. | |
| 2016/0339646 A1 | 11/2016 | Baecker et al. | |
| 2016/0342149 A1 | 11/2016 | Napadensky | |
| 2016/0361763 A1 | 12/2016 | Batchelder et al. | |
| 2016/0369096 A1 | 12/2016 | Rolland et al. | |
| 2016/0375636 A1 | 12/2016 | Rodgers et al. | |
| 2016/0378004 A1 | 12/2016 | Martin | |
| 2017/0050389 A1 | 2/2017 | Lee | |
| 2017/0129167 A1 | 5/2017 | Castanon | |
| 2017/0151717 A1 | 6/2017 | Li | |
| 2018/0029290 A1* | 2/2018 | Bottiglio | B29C 64/106 |
| 2018/0029296 A1* | 2/2018 | Van Esbroeck | B33Y 30/00 |
| 2018/0029311 A1 | 2/2018 | Depalma et al. | |
| 2018/0036941 A1 | 2/2018 | Xu et al. | |
| 2018/0136514 A1* | 5/2018 | van Esbroeck | B33Y 30/00 |
| 2018/0200948 A1 | 7/2018 | Kuijpers et al. | |
| 2018/0333917 A1 | 11/2018 | Lee et al. | |
| 2018/0341184 A1* | 11/2018 | Hundley | B33Y 40/00 |
| 2019/0116938 A1* | 4/2019 | DeHaven | A43D 8/38 |
| 2019/0212572 A1 | 7/2019 | Tomioka | |
| 2020/0001525 A1 | 1/2020 | Wynne et al. | |
| 2020/0180215 A1* | 6/2020 | Truong | B29C 64/135 |

FOREIGN PATENT DOCUMENTS

| | | |
|---|---|---|
| CN | 108773067 A | 11/2018 |
| JP | 2948893 B2 | 9/1999 |
| WO | WO9937453 A1 | 7/1999 |
| WO | WO9937454 A1 | 7/1999 |
| WO | WO9937456 A1 | 7/1999 |
| WO | WO9937457 A1 | 7/1999 |
| WO | WO9960508 A1 | 11/1999 |
| WO | WO2007005236 A1 | 11/2007 |
| WO | WO2009088420 A1 | 7/2009 |
| WO | WO2009088423 A1 | 7/2009 |
| WO | WO2012140658 A2 | 10/2012 |
| WO | WO2012140658 A3 | 10/2012 |
| WO | WO2014149312 A1 | 9/2014 |
| WO | WO2014186463 A1 | 11/2014 |
| WO | WO2015084422 A1 | 6/2015 |
| WO | 2015/164234 A1 | 10/2015 |
| WO | WO2015145439 A1 | 10/2015 |
| WO | WO2015170330 A1 | 11/2015 |
| WO | WO2015175682 A1 | 11/2015 |
| WO | WO2016009426 A1 | 1/2016 |
| WO | WO2016010946 A1 | 1/2016 |
| WO | WO2016014088 A1 | 1/2016 |
| WO | WO2016014543 A1 | 1/2016 |
| WO | WO2016049642 A1 | 3/2016 |
| WO | WO2016063282 A1 | 4/2016 |
| WO | WO2016081410 A1 | 5/2016 |
| WO | WO2016085965 A1 | 6/2016 |
| WO | WO2016106136 A2 | 6/2016 |
| WO | WO2016106136 A3 | 6/2016 |
| WO | WO2016109550 A1 | 7/2016 |
| WO | WO-2016122408 A1 * | 8/2016 ........... B29C 64/255 |
| WO | WO2016123499 A1 | 8/2016 |
| WO | WO2016123506 A1 | 8/2016 |
| WO | WO2016125170 A1 | 8/2016 |
| WO | WO2016126796 A2 | 8/2016 |
| WO | WO2016126796 A3 | 8/2016 |
| WO | WO2016133759 A1 | 8/2016 |
| WO | WO2016138345 A1 | 9/2016 |
| WO | WO2016140886 A1 | 9/2016 |
| WO | WO2016140891 A1 | 9/2016 |
| WO | WO2016142947 A2 | 9/2016 |
| WO | WO2016142947 A3 | 9/2016 |
| WO | WO2016145050 A1 | 9/2016 |
| WO | WO2016145182 A1 | 9/2016 |
| WO | WO2016149097 A1 | 9/2016 |
| WO | WO2016149104 A1 | 9/2016 |
| WO | WO2016149151 A1 | 9/2016 |
| WO | WO2016151586 A1 | 9/2016 |
| WO | WO2016172784 A1 | 11/2016 |
| WO | WO2016172788 A1 | 11/2016 |
| WO | WO2016172804 A1 | 11/2016 |
| WO | WO2016172805 A1 | 11/2016 |
| WO | WO2016191473 A1 | 12/2016 |
| WO | WO2016199131 A1 | 12/2016 |
| WO | WO2016205690 A1 | 12/2016 |
| WO | WO2017009830 A1 | 1/2017 |
| WO | WO2017009831 A1 | 1/2017 |
| WO | WO2017009832 A1 | 1/2017 |
| WO | WO2017009833 A1 | 1/2017 |
| WO | WO2017056124 A1 | 4/2017 |
| WO | WO2017210298 A1 | 12/2017 |
| WO | WO2017219942 A1 | 12/2017 |
| WO | WO2018006029 A1 | 1/2018 |
| WO | WO2018032531 A1 | 2/2018 |
| WO | WO2019014098 A1 | 1/2019 |

OTHER PUBLICATIONS

International Search Report and Written Opinion dated Oct. 12, 2018, from the ISA/EPO, for International Patent Application No. PCT/US2018/041225 (filed Jul. 9, 2018), 14 pages.

International Application No. PCT/US2019/045214; International Search Report and Written Opinion; ISA/EP; dated Nov. 26, 2019; 16 pages.

Amendment filed Feb. 5, 2021, from U.S. Appl. No. 16/373,449 (filed Apr. 2, 2019), 8 pgs.

Notice of Allowance dated Feb. 17, 2021, from U.S. Appl. No. 16/373,449 (filed Apr. 2, 2019), 8 pgs.

Amendment filed Jan. 25, 2021, from U.S. Appl. No. 16/105,307 (filed Aug. 20, 2018), 12 pgs.

International Preliminary Report on Patentability dated Feb. 17, 2021, for International Patent Application No. PCT/US2020/026342 (filed Apr. 2, 2020), 10 pgs.

International Search Report and Written Opinion dated Jul. 7, 2020, from ISA/European Patent Office, for International Patent Application No. PCT/US2020/026342 (filed Apr. 2, 2020), 49 pages.

Non-Final Office Action dated Jan. 7, 2021, from U.S. Appl. No. 16/105,307 (filed Aug. 20, 2018), 14 pgs.

International Preliminary Report on Patentability dated May 20, 2021, from the The International Bureau of WIPO, for International Patent Application No. PCT/US2019/060219 (filed Nov. 7, 2019), 14 pgs.

International Search Report and Written Opinion dated Jun. 24, 2020, from the ISA/European Patent Office, for International Application No. PCT/US2019/060219 (filed Nov. 7, 2019), 22 pgs.

International Preliminary Report on Patentability dated Apr. 1, 2021, from teh IPEA/US, for International Patent Application No. PCT/US2019/045214 (filed Aug. 6, 2019), 13 pgs.

Written Opinion of the International Preliminary Examining Authority dated Feb. 16, 2021, from the IPEA/European Patent Office, for International Patent Application No. PCT/US2020/013895 (filed Jan. 16, 2020), 6 pgs.

(56) References Cited

OTHER PUBLICATIONS

International Search Report dated May 7, 2020, from the ISA/European Patent Office, for International Application No. PCT/US2020/013895 (filed Jan. 16, 2020), 3 pgs.
Written Opinion dated May 7, 2020, from the ISA/European Patent Office, for International Application No. PCT/US2020/013895 (filed Jan. 16, 2020), 6 pgs.
International Preliminary Report on Patentability dated Jun. 14, 2021, from the IPEA/European Patent Office, for International Patent Application No. PCT/US2020/013895 (filed Jan. 16, 2020), 14 pgs.

* cited by examiner

THREE-DIMENSIONAL PRINTING SYSTEM

RELATED APPLICATIONS

This is a NONPROVISIONAL of, claims priority to, and incorporates by reference U.S. Provisional Application No. 62/758,413, filed Nov. 9, 2018.

FIELD OF THE INVENTION

The present invention relates to additive manufacturing systems in which a photo-sensitive resin within a tank is cured through exposure to radiation when fabricating an object, and in particular to resin circulatory systems, and tank and membrane assembly components of such systems.

BACKGROUND

Within the field of additive manufacturing, so-called three-dimensional printing, or 3D printing, by means of photo-curing a viscous, liquid resin (typically a liquid polymer) layer-by-layer to form a desired object has become very popular. In this field, two basic technologies are employed: stereolithographic (SL) printing, in which a laser, emitting radiation at approximately 400 nm, is used to cure the liquid resin; and Digital Light Processing (DLP) printing, in which the liquid resin is exposed to the luminous radiation emitted by a device similar to a projector. A variation of DLP printing employs a light engine composed of one or more light emitting diodes (LEDs) that radiate in the ultraviolet (UV) spectrum.

In both the SL and DLP processes, printing of the object proceeds layer-by-layer, that is, polymerizing a first layer of the liquid resin adhering to an extraction (or build) plate, polymerizing a second layer adhering to the first layer, and so on until formation of the complete object. Data representing the three-dimensional object to be formed is organized as a series two-dimensional layers that represent transversal sections of the object, and the build proceeds according to that design. While such builds can proceed top down, where the entire object is formed within the liquid resin and then extracted in full, the so-called bottom-up method in which the extraction plate is raised, and the object thereby moved from the bottom of a vat of resin upwards, layer-by-layer is more popular for small and desktop printing applications.

The polymerization process by which the liquid resin solidifies into the desired object layers is exothermic. Perhaps because of the highly viscous nature of the resin, at least in part, the heat generated by this process tends to remain localized within the area in which printing occurs—the so-called build area. This heating can be quite detrimental, especially in continuous or near-continuous printing operations, as excessive heat in the build area will affect the quality of the layers being printed, e.g., by contributing to undesired curing of the resin.

Discussed herein are techniques to address the heating of the resin, as well as other improvements to the 3D printing system.

SUMMARY OF THE INVENTION

A vat polymerization apparatus configured in accordance with one embodiment of the invention includes a tank (or vat) configured to contain a resin and including an entrance port and an exit port and a resin circulatory system. The resin circulatory system includes a pair of pumps wherein a first one of the pumps is arranged to extract the resin from the tank through the exit port of the tank, and a second one of the pumps is arranged to flow the resin (or a fluid or the combination of the resin and the fluid) into the tank via the entrance port of the tank. In particular, the first pump is configured to extract the resin from the tank and flow the resin towards a branch point fluidly coupled to the first pump. A first valve regulates flow of the resin from the branch point to an inlet of a first reservoir and a second valve regulates flow of the resin from the branch point to a first confluence point. Resin flow is also regulated from an outlet of the first reservoir, in particular a third valve regulates flow of the resin from the outlet of the first reservoir to a second confluence point, and a fourth valve regulates flow of the resin from the first confluence point to the second confluence point. A second reservoir is configured to supply a fluid that includes fresh resin and/or an additive to the first confluence point, and a second pump is configured to extract the resin, the fluid, or a combination of the resin and the fluid from the second confluence point and flow the resin, the fluid, or the combination of the resin, as appropriate, and the fluid into the tank via the entrance port of the tank.

A further embodiment of the invention provides a process for operating a vat polymerization apparatus of the kind described above. In that process, the first and third valves are opened and the second and fourth valves are closed during a first time period, so as to flow resin from the tank through the first reservoir and back into the tank. During a second time period, the first and third valves are closed and the second and fourth valves are opened so as to flow resin from the tank to the first confluence point attached to the second reservoir and flow the combination of the resin and the fluid into the tank.

Another embodiment of the invention concerns a membrane assembly for a 3D printing system. The assembly includes a radiation-transparent flexible membrane and a frame affixed to a perimeter of the radiation-transparent flexible membrane. The frame is configured to stretch the radiation-transparent flexible membrane along a first plane, and includes a lip extending perpendicular to the first plane. The lip is configured to be secured to a bottom rim of a tank sidewall; thus, when the membrane assembly is secured to the bottom of the tank sidewall, it forms a bottom of the tank that contains a photo-curing liquid resin.

In some instances, the membrane assembly includes a tension adjustment mechanism configured to adjust the tension of the radiation-transparent flexible membrane. A tension sensor (e.g., a strain gauge) may be affixed to a surface of the radiation-transparent flexible membrane and configured to measure a tension of the radiation-transparent flexible membrane. In other instances, a tension sensor such as a conductive strip may be embedded within the radiation-transparent flexible membrane and configured to measure a tension of the radiation-transparent flexible membrane.

Such a tension sensor may be a component of a tank assembly that also includes a tank sidewall, wherein the tension sensor coupled to the tank sidewall and a bottom rim of the tank sidewall includes a groove. A radiation-transparent flexible membrane may be secured within a frame that includes a lip that engages with the groove of the bottom rim of the tank sidewall. The tension sensor may be configured to detect a movement of the radiation-transparent flexible membrane upon a loss of tension of the radiation-transparent flexible membrane.

Still another embodiment of the invention provides an apparatus that includes a glass frame assembly having a first frame supporting a glass plate and/or radiation-transparent flexible membrane and including a first plurality of through holes and a first plurality of magnetized portions distributed about a surface of the first frame; and a liquid crystal display (LCD) assembly having a second frame and an LCD. The second frame is configured to hold the LCD and includes a second plurality of through holes and a second plurality of magnetized portions distributed about a surface of the second frame. The pattern in which the first plurality of through holes are distributed about the surface of the first frame is a mirror image of the pattern in which the second plurality of through holes are distributed about the surface of the second frame, and the pattern in which the first plurality of magnetized portions are distributed about the surface of the first frame is a mirror image of a pattern in which the second plurality of magnetized portions are distributed about the surface of the second frame. Each of the first plurality of magnetized portions is attracted to a corresponding one of the second plurality of magnetized portions such that when the first frame is disposed in proximity to the second frame, the surface of the first frame is attracted to and automatically contacts the surface of the second frame such that each one of the first plurality of through holes automatically aligns with a corresponding one of the second plurality of through holes. In some instances, a gasket is disposed within or near a boundary region between the surface of the first frame and the surface of the second frame. The gasket prevents resin from contacting the region between the glass plate and the LCD.

Another embodiment of the invention provides a 3D printing system having a tank assembly with a tank sidewall, and a radiation-transparent flexible membrane within a first frame, wherein a bottom rim of the tank sidewall includes a groove and the first frame has a lip that engages with the groove of the bottom rim of the tank sidewall. The assembly further includes a lighting assembly having a glass plate secured within a second frame; and a liquid crystal display (LCD) secured within a third frame, wherein the second frame is secured to the third frame, and wherein the second frame is configured to displace a portion of the radiation-transparent flexible membrane away from a first plane into a second plane parallel to the first plane, wherein the first plane defines a region in which the radiation-transparent flexible membrane lies absent the displacement of the portion of the radiation-transparent flexible membrane by the second frame.

Such an assembly may also include a base portion configured to support at least one of the third frame or the LCD and a height adjustment mechanism disposed between the first frame and the base portion. The height adjustment mechanism may be configured to adjust a vertical position of the first frame with respect to the base portion, and in turn adjust the displacement of the portion of the radiation-transparent flexible membrane with respect to the first plane. Alternatively, the base portion may be configured to support the first frame and the height adjustment mechanism disposed between the base portion and at least one of the third frame or the LCD and configured to adjust a vertical position of the LCD with respect to the base portion, and in turn adjust the displacement of the portion of the radiation-transparent flexible membrane with respect to the first plane.

Still another embodiment of the invention provides a 3D printing system having a tank assembly and a radiation-transparent flexible membrane. The tank assembly includes a tank sidewall having a bottom rim with a groove. The radiation-transparent flexible membrane is secured in a first frame that has a lip which engages the groove of the bottom rim of the tank sidewall. An LCD is secured within a second frame and is configured to displace a portion of the radiation-transparent flexible membrane away from a first plane into a second plane parallel to the first plane, wherein the first plane defines a region in which the radiation-transparent flexible membrane lies absent the displacement of the portion of the radiation-transparent flexible membrane by the second frame.

These and further embodiments of the invention are described in detail below with reference to the accompanying drawings.

DETAILED DESCRIPTION OF THE INVENTION

Figure 1A:
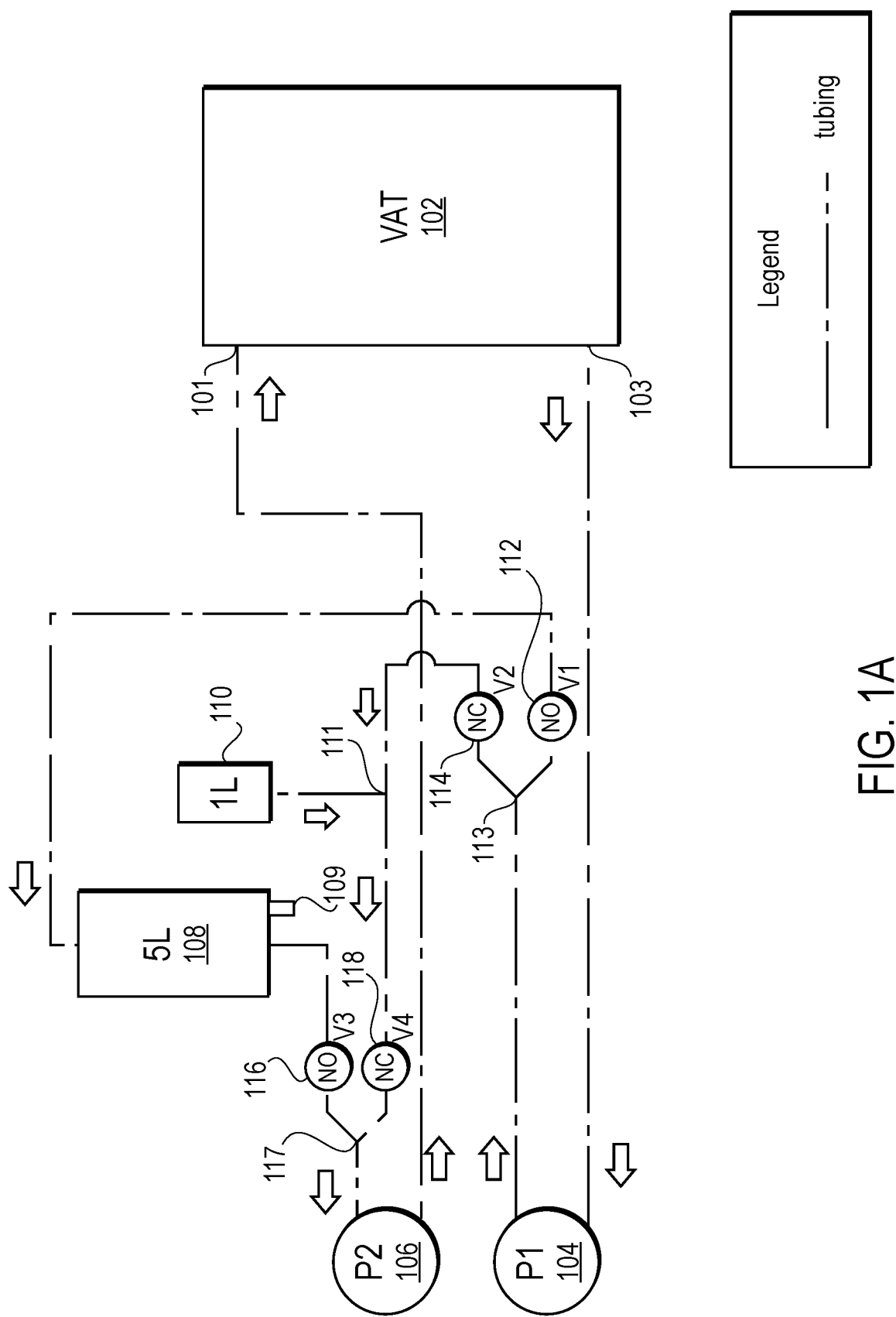
FIG. 1A depicts a block diagram of a resin circulatory system for a three-dimensional (3D) printing system, in accordance with one embodiment of the invention.

The present invention relates to systems and methods of additive manufacturing in which a photo-sensitive resin is cured through exposure to radiation when fabricating an object, and in some embodiments, to methods and systems for cooling the photo-sensitive resin through displacement of the resin with respect to a build area of the object, and in some embodiments, to a membrane assembly, and in some embodiments, to a mechanism for self-aligning a glass plate frame to a liquid crystal display (LCD) frame, and in some embodiments, to a tension sensor integrated with a the membrane assembly, and in some embodiments, to a tension sensor integrated with a tank assembly, and in some embodiments to a tension adjustment mechanism embedded within the membrane assembly, and in some embodiments, to a tension adjustment mechanism external to the membrane assembly, and in some embodiments, to a three-dimensional printing system with a membrane displaced from its rest plane FIG. 1A depicts a block diagram of a resin circulatory system for a three-dimensional (3D) printing system. Tank 102 (also labelled as "VAT") is configured to contain a photo-sensitive liquid resin that is used to form one or more objects during a 3D printing process. Before, during or after the 3D printing of the object within tank 102, the resin circulatory system may be configured to extract resin from tank 102 via exit port 103 of the tank and introduce resin into tank 102 via entrance port 101 of the tank. One or more of the following tasks may be accomplished via such a resin circulatory system, including cooling the resin, draining resin that has been depleted of photo-curing polymers, filtering impurities (e.g., including fragments of cured polymer) from the resin, supplying fresh resin to the tank, and introducing additives to the resin.

The resin circulatory system may include pump 104 (also labelled as "P1") that is configured to extract the resin from tank 102 through exit port 103, and flow the resin towards branch point 113. It is understood that tubing (indicated in solid-dashed line) may be used to fluidly couple any two components depicted in FIGS. 1A-1C, such as pump 104 and tank 102.

Branch point 113 may be fluidly coupled to pump 104, valve 112 (also labelled as "V1") and valve 114. Valve 112 may regulate a flow of the resin from branch point 113 to an inlet of reservoir 108. In one embodiment, reservoir 108 may be 5 Liters in volume. In operation, reservoir 108 may be partially or fully filled with resin. Drain 109 may be disposed on a bottom portion of reservoir 108 and may be used to drain the resin when necessary to dispose of resin that has been depleted of photo-curing polymers.

Valve 114 (also labelled as "V2") may regulate a flow of the resin from branch point 113 to confluence point 111. Resin flowing from valve 114 and a fluid flowing from reservoir 110 may mix at confluence point 111 before flowing towards valve 118. The fluid may comprise fresh (i.e., not previously used) resin, an additive or another liquid. In one embodiment, reservoir 110 may be 1 Liter in volume. Valve 116 (also labelled as "V3") may regulate a flow of the resin from an outlet of reservoir 108 to confluence point 117. Valve 118 (also labelled as "V4") may regulate a flow of the resin from confluence point 111 to confluence point 117. Pump 106 may be configured to extract the resin, the fluid or a combination of the resin and the fluid from confluence point 117 and flow the resin, the fluid or the combination of the resin and the fluid into tank 102 via entrance port 101.

Figure 1B:
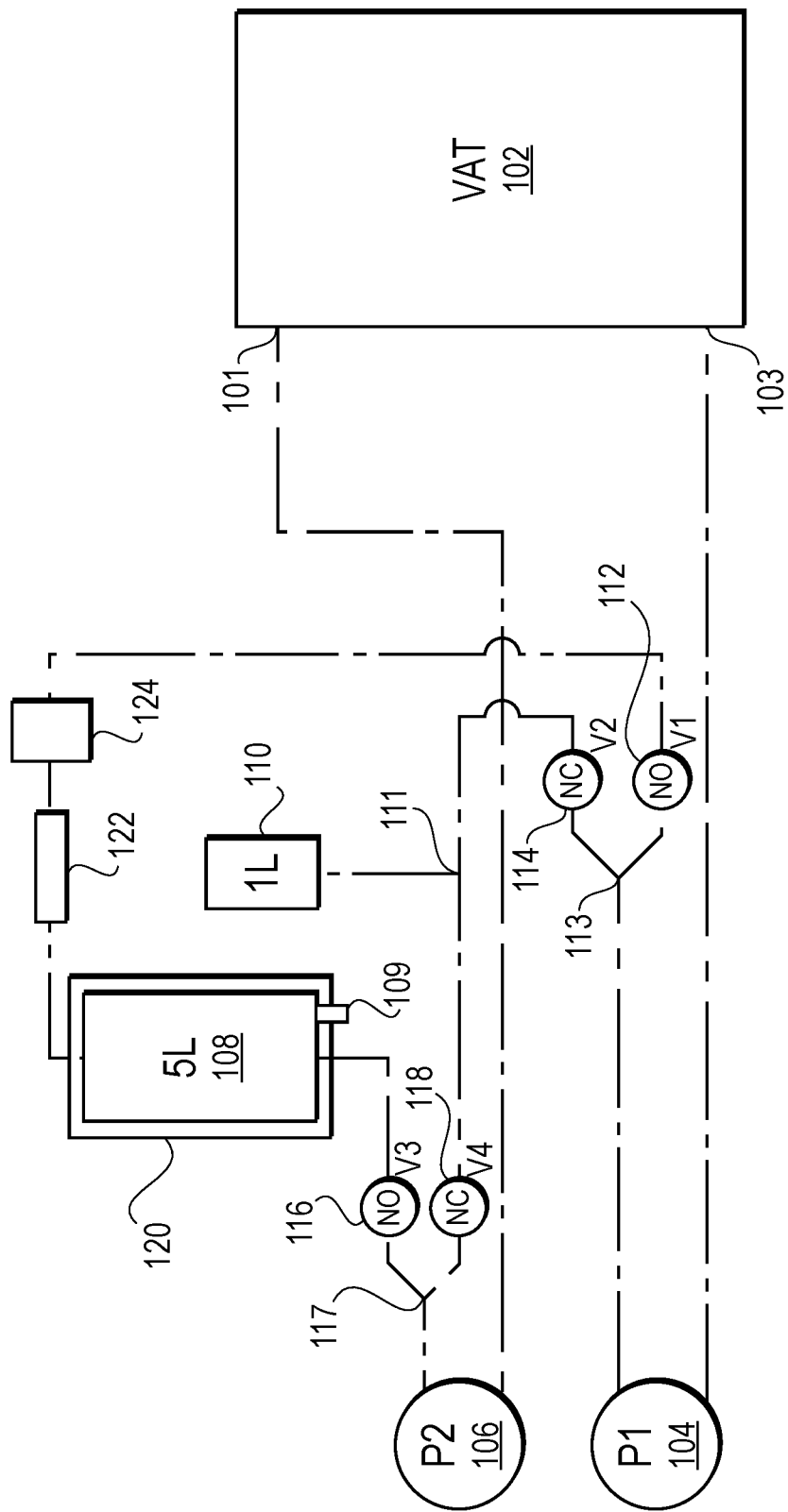
FIG. 1B depicts the resin circulatory system of FIG. 1A additionally with cooling and filtration components, in accordance with one embodiment of the invention.

FIG. 1B depicts the resin circulatory system of FIG. 1A additionally with cooling and filtration components. Resin may be cooled within reservoir 108 via cooling jacket 120 and/or cooled within tubing via cooling sleeve 122. The location of cooling sleeve 122 as shown in FIG. 1B is for illustrative purposes only, and it is understood that cooling sleeve 122 may be located along any section of tubing fluidly coupling exit port 103 to entrance port 101.

Cooling of resin may be necessary due to an exothermic reaction which takes place when resin is cured in tank 102. If cooling of resin is not performed, resin within tank 102 may heat up over time, leading to an unintended curing of resin (and potentially a loss of resolution in the printing process). Additionally, filter 124, disposed along a section of tubing, may be used to remove particulates, impurities and/or other contaminants from the recirculating resin. The location of filter 124 as shown in FIG. 1B is for illustrative purposes only, and it is understood that filter 124 may be located along any section of tubing fluidly coupling exit port 103 to entrance port 101.

Figure 1C:
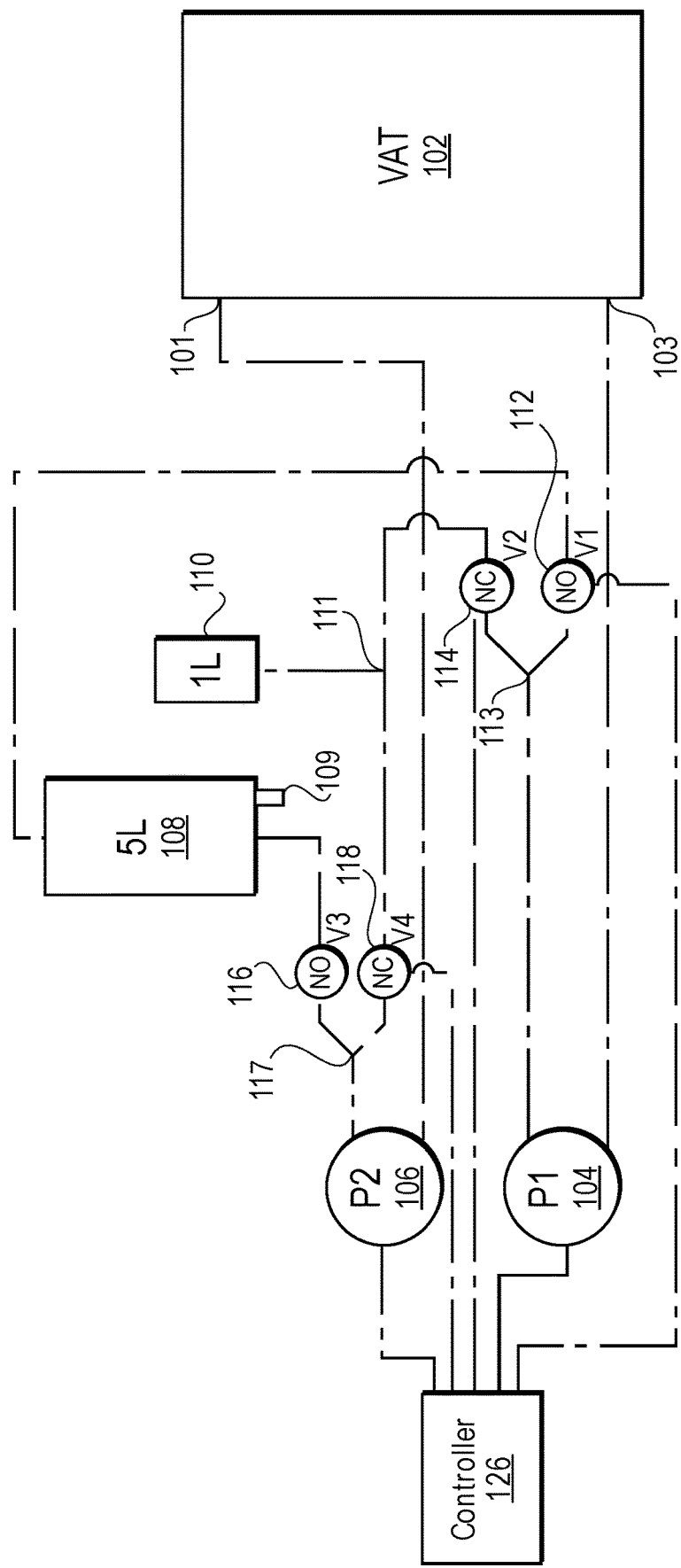
FIG. 1C depicts the resin circulatory system of FIG. 1A additionally with a controller, in accordance with one embodiment of the invention.

FIG. 1C depicts the resin circulatory system of FIG. 1A additionally with controller 126. Controller 126 may be communicatively coupled to one or more of pumps 104 and 106; and valves 112, 114, 116 and 118. Controller 126 may control a pumping speed of pumps 104 and 106, as well as the degree to which one or more of valves 112, 114, 116 and 118 are open or closed. For clarity of discussion, a valve being "open" refers to the state in which a fluid is able to flow through the valve, whereas a valve being "closed" refers to the state in which a fluid is not able to flow through the valve. While the use of controller 126 to control the operational state of one or more of pumps 104 and 106; and valves 112, 114, 116 and 118 in accordance with a computer program is contemplated, it is certainly possible that one or more of pumps 104 and 106; and valves 112, 114, 116 and 118 can also be manually controlled by a human operator.

Several modes of operation of the resin circulatory system are contemplated. In a first mode, valves 112 and 116 are open and valves 114 and 118 are closed, causing pumps 104 and 106 to circulate resin from tank 102 through reservoir 108 and optionally, back into tank 102. Operation in accordance with the first mode may occur in order to cool, filter and/or drain (i.e., remove) the resin.

In a second mode, valves 112 and 116 are closed and valves 114 and 118 are open, causing pumps 104 and 106 to circulate resin from tank 102 through confluence point 111 and back into tank 102. Operation in accordance with the second mode may occur in order to inject fluid from reservoir 110 into the resin from tank 102. As mentioned above, the fluid may include fresh resin, an additive or another liquid.

In a third mode, pump 104 may be turned off, pump 106 may be turned on, valves 112, 114 and 116 may be closed and valve 118 may be open in order to fill an initially empty tank 102 with resin from reservoir 110 (e.g., as part of an initialization procedure).

In a fourth mode, valves 112, 114, 116 and 118 may all be fully (or partially) open. The fourth mode is functionally equivalent to a mixture of the first and second modes.

In FIGS. 1A-1C, valves 112 and 116 have also been labelled as "NO" (shorthand for "normally open") and valves 114 and 118 have also been labelled as "NC" (shorthand for "normally closed"). As such, it is contemplated that the resin circulatory system typically operates in the first mode and occasionally switches to the second mode of operation (although the third and fourth modes of operation are possible).

It is understood that aspects of one or more of the resin circulatory systems depicted in FIGS. 1A-1C may be incorporated into one resin circulatory system. Aspects of the resin circulatory system have been depicted separately in FIGS. 1A-1C for ease of illustration and description.

Figure 2:
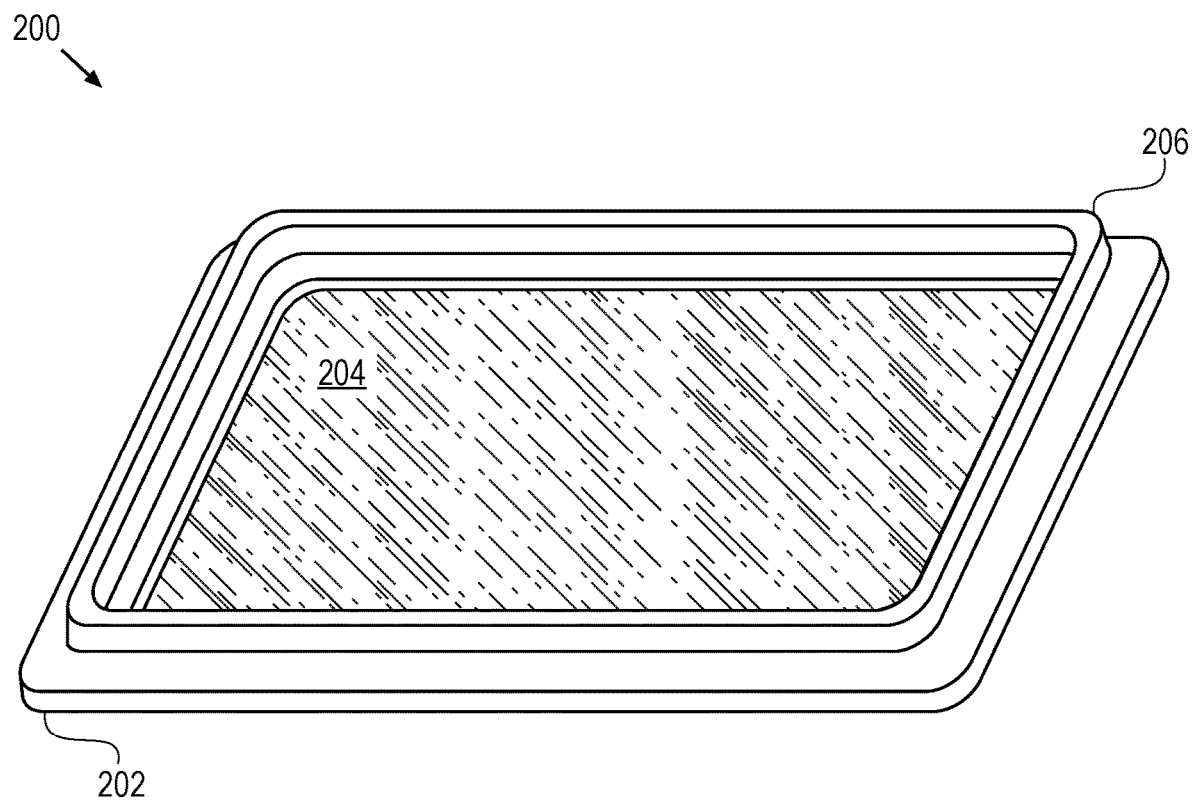
FIG. 2 depicts a perspective view of a membrane assembly for a 3D printing system, in accordance with one embodiment of the invention.
Figure 3:
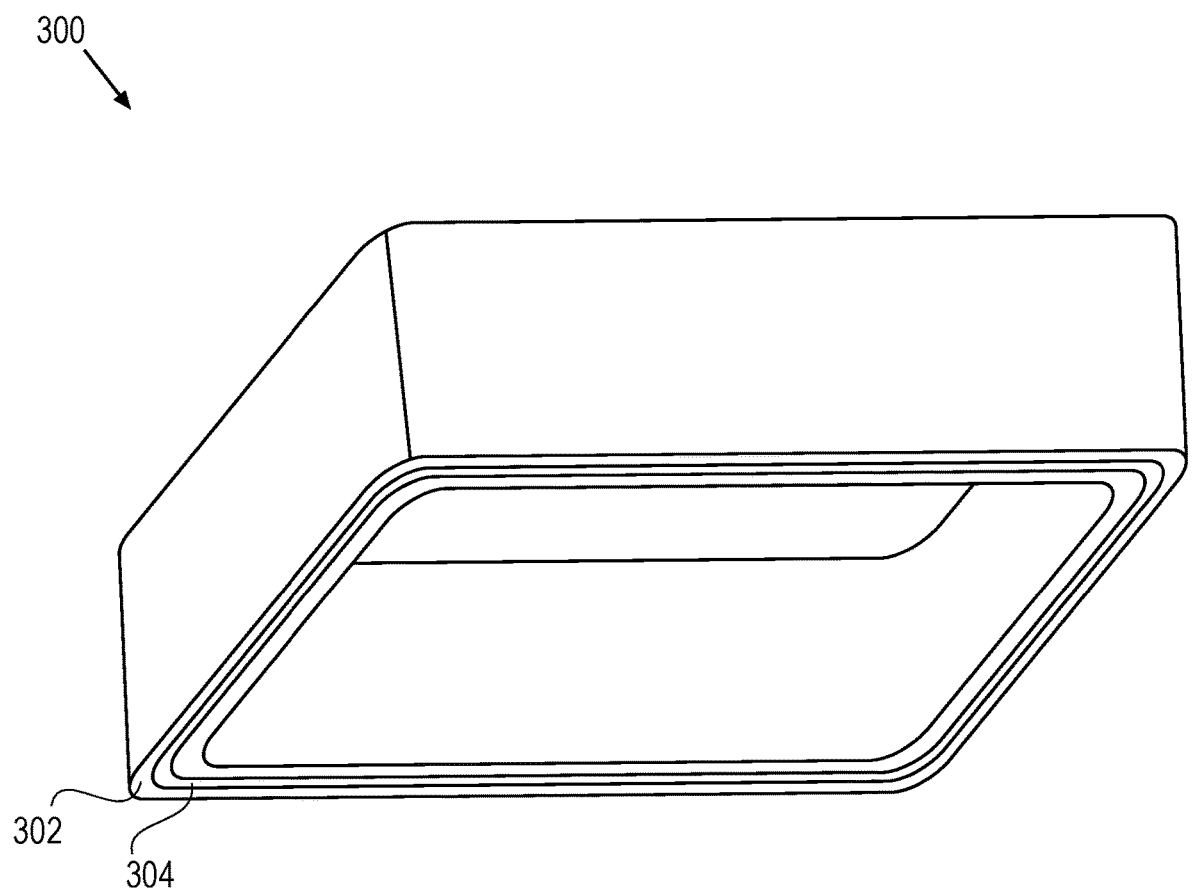
FIG. 3 depicts a perspective view of a tank sidewall for a 3D printing system, in accordance with one embodiment of the invention.

FIG. 2 depicts a perspective view of membrane assembly 200 for a 3D printing system. Membrane assembly 200 may include radiation-transparent flexible membrane 204 whose perimeter is secured to frame 202. Frame 202 may be configured to stretch membrane 204 along a first plane. Frame 202 may comprise lip 206 that extends in a direction perpendicular to the first plane. Lip 206 may be secured to a bottom rim of a tank sidewall (as depicted in FIG. 3). Membrane assembly 200, when secured to the bottom rim of the tank sidewall, forms a bottom of a tank configured to contain a photo-curing liquid resin. In FIG. 2, frame 202 is depicted to have a rectangular shape. It is understood that other shapes for frame 202 are possible, including square, oval, circular, etc.

FIG. 3 depicts a perspective view of tank sidewall 300 for a 3D printing system. The tank sidewall 300 includes bottom rim 302 with groove 304. Lip 206 of frame 202 may be inserted within groove 304 so as to secure membrane assembly 200 onto the base of tank sidewall 300. It is understood that the shape and dimensions of tank sidewall 300 must match the shape and dimensions of frame 202. For instance, if frame 202 were rectangular, a tank sidewall 300 must also be rectangular (i.e., when viewed from above).

Figure 4A:
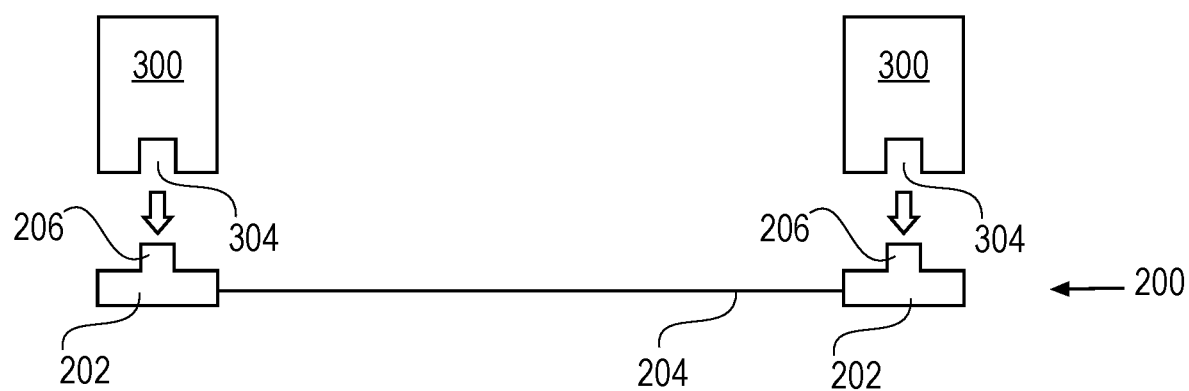
FIGS. 4A and 4B depict cross-sectional views of the membrane assembly and the tank sidewall so as to describe a process in which the membrane assembly is secured to the bottom rim of the tank sidewall, in accordance with one embodiment of the invention.
Figure 4B:
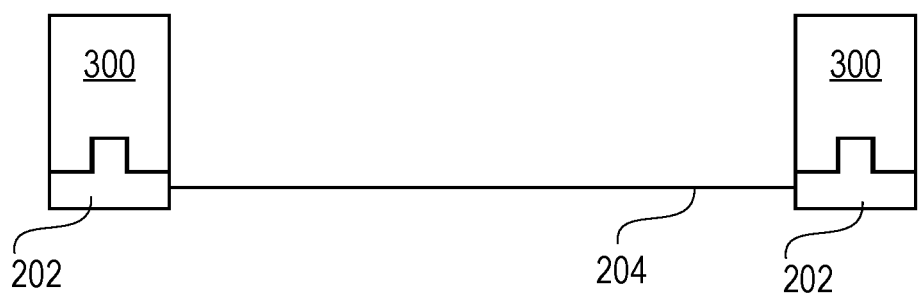

FIGS. 4A and 4B depict cross-sectional views of membrane assembly 200 (with frame 202 and membrane 204) and tank sidewall 300 so as to describe a process in which membrane assembly 200 is secured to bottom rim 302 of tank sidewall 300. FIG. 4A depicts lip 206 of frame 202 aligned under groove 304 of tank sidewall 300. FIG. 4B depicts lip 206 of frame 202 inserted within groove 304 of tank sidewall 300. Lip 206 and groove 304 may interlock with one another (e.g., in a snap-fit attachment), may snugly fit so that surfaces of lip 206 and groove 304 contact one another (e.g., in a friction-fit attachment), etc. In one embodiment, membrane assembly 200 may be a "consumable" product, in that it is disposed of or refurbished at the end of its useful lifetime. As such, membrane assembly 200 may play a similar role as printer cartridges in a printer; razor blades in a razor; etc.

Figure 5A:
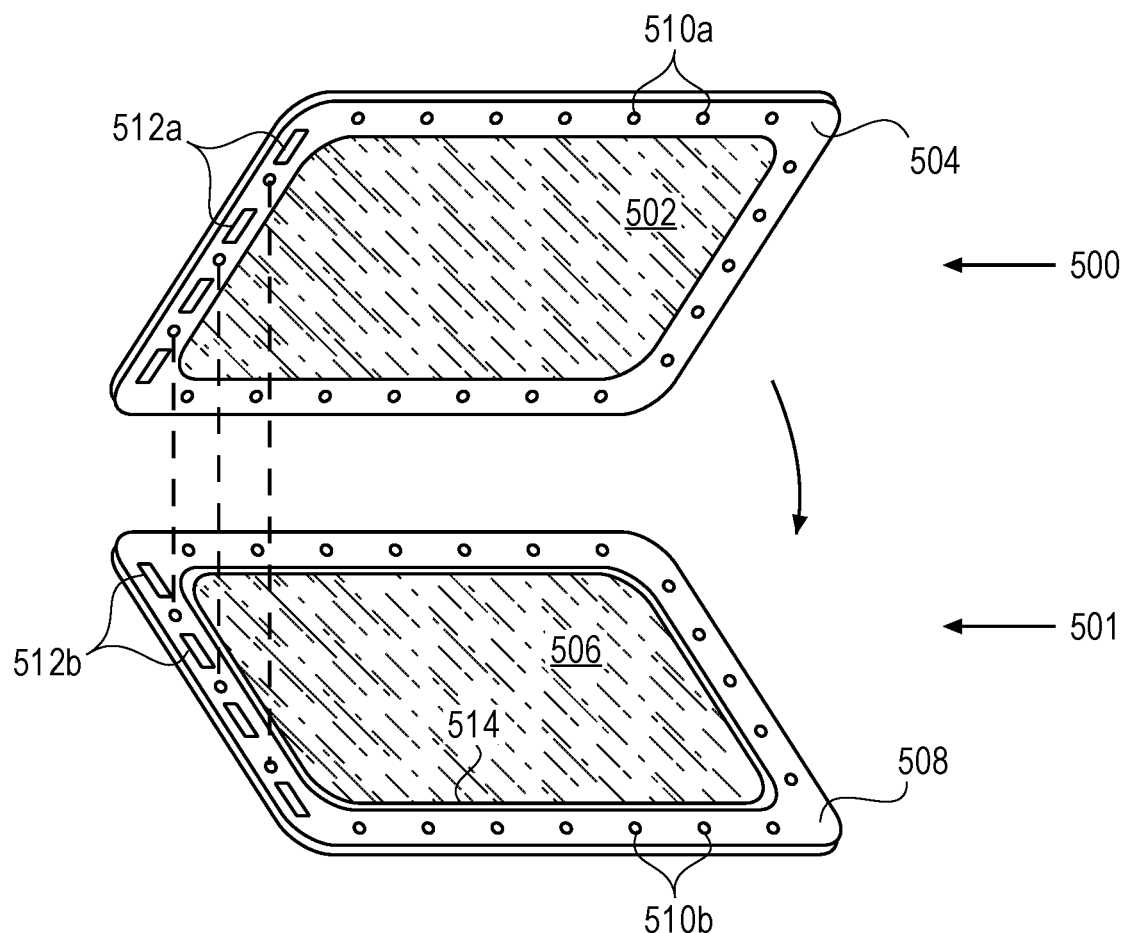
FIGS. 5A and 5B depict perspective views of a glass plate assembly and a liquid crystal display (LCD) assembly so as to describe a mechanism in which the glass plate assembly is secured to the LCD assembly, in accordance with one embodiment of the invention.
Figure 5B:
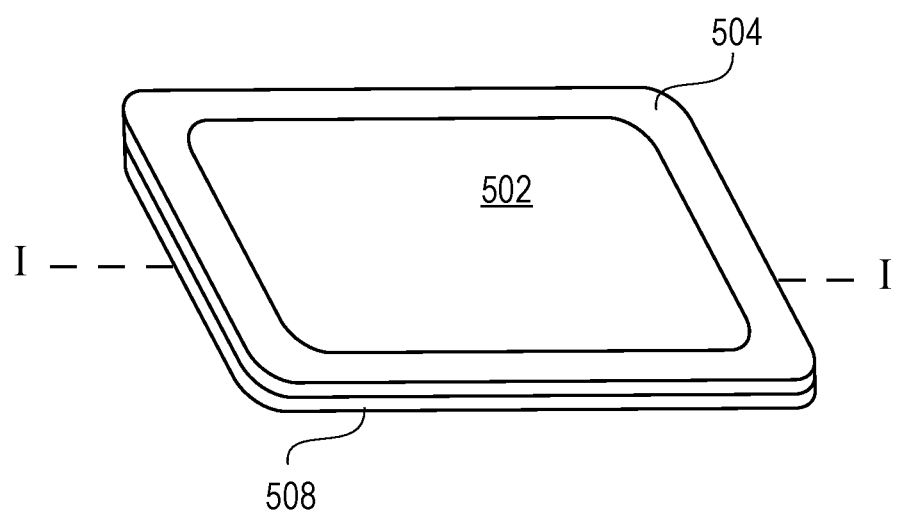

FIGS. 5A and 5B depict perspective views of frame assembly 500 and LCD assembly 501 so as to describe a mechanism in which frame assembly 500 may be secured to LCD assembly 501. Frame assembly 500 may include frame 504 and glass plate 502, in which frame 504 is configured to hold glass plate 502. In other embodiments, the frame assembly 500 may support a radiation-transparent flexible membrane, as discussed above, instead of or in addition to a glass plate. Frame 504 may comprise through holes 510a and magnetized portions 512a distributed about a bottom surface of frame 504. LCD assembly 501 may include frame 508 and LCD 506, in which frame 508 is configured to hold LCD 506. Frame 508 may comprise through holes 510b and magnetized portions 512b distributed about a top surface of frame 508.

As depicted in FIG. 5A, a pattern in which through holes 510a are distributed about the bottom surface of frame 504 may be a mirror image of a pattern in which through holes 510b are distributed about the top surface of frame 508. As further depicted in FIG. 5A, a pattern in which magnetized portions 512a are distributed about the bottom surface of the frame 504 may be a mirror image of a pattern in which magnetized portions 512b are distributed about the top surface of frame 508. Each one of magnetized portions 512a may be attracted to a corresponding one of magnetized portions 512b such that when frame 504 is disposed in a proximity of frame 508, the bottom surface of the frame 504 automatically contacts the top surface of frame 508, and each one of the through holes 510a automatically aligns with a corresponding one of through holes 510b. Gasket 514 may be disposed at or near a perimeter of LCD 506. The purpose of gasket 514 will be explained below in FIG. 5C.

FIG. 5B depicts a perspective view of frame 504 affixed to LCD frame 508. Frame 504 surrounds glass plate 502 and/or a radiation-transparent flexible membrane. LCD 506 is not visible in FIG. 5B and is located directly beneath glass panel 502. It is understood that small screws or pins may be inserted through aligned pairs of through holes 510a and 510b. Openings for such screws or pins may be located in a bottom surface of frame 508 (not depicted).

Figure 5C:
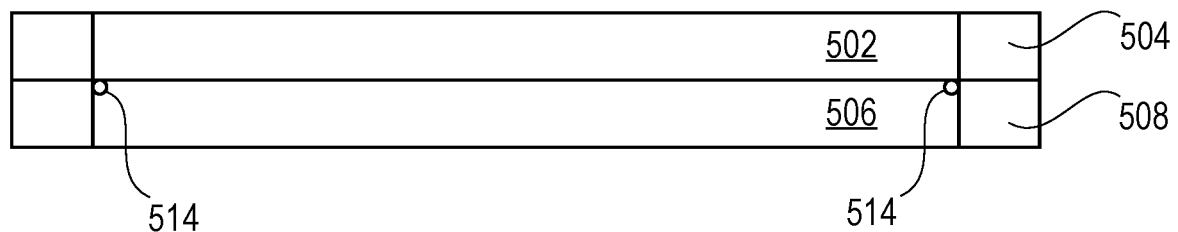
FIG. 5C depicts a cross-sectional view along line I-I of FIG. 5B, in accordance with one embodiment of the invention.

FIG. 5C depicts a cross-sectional view along line I-I of FIG. 5B. As shown in FIG. 5C, frame assembly 500 is affixed to the LCD assembly 501. More particularly, a bottom surface of frame 504 contacts a top surface of frame 508, and glass plate 502 and/or a radiation-transparent flexible membrane is disposed above LCD 506. Gasket 514 may be disposed within or near a boundary region between the bottom surface of frame 504 and the top surface of frame 508. In the event that resin (or another fluid) is able to penetrate the boundary region between the bottom surface of frame 504 and the top surface of frame 508, gasket 514 may prevent the resin from flowing between LCD 506 and glass plate 502 (which may lead to undesirable distortion in images projected from LCD 506).

As described above, magnets (or magnetized portions of the frames) were used to automatically align through holes 510a with through holes 510b. In addition or alternatively, grooves (e.g., saw tooth grooves) disposed on both the bottom surface of frame 504 and the top surface of frame 508 (and particularly grooves in the bottom surface that are complementary to grooves in the top surface) may also be used as a self-alignment mechanism.

Figure 6A:
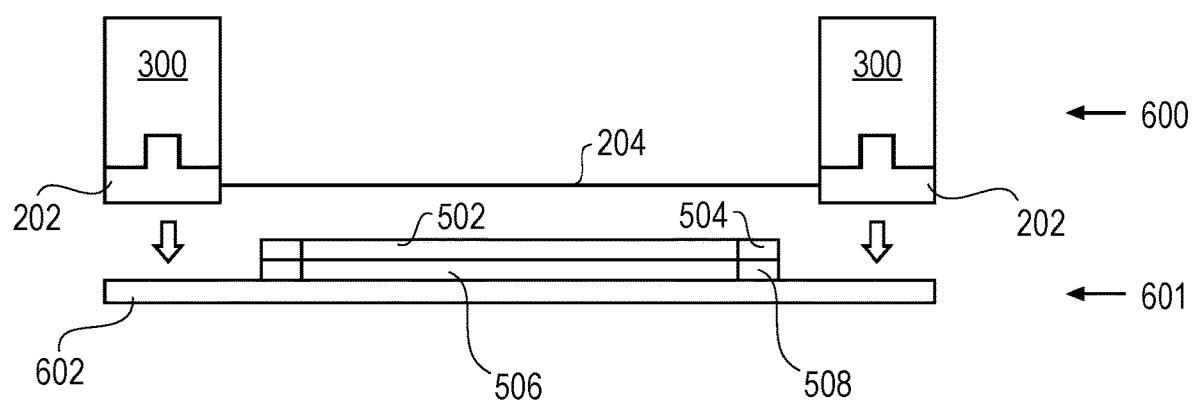
FIGS. 6A and 6B depict cross-sectional views of components of a 3D printing system so as to describe a process in which the 3D printing system is assembled, in accordance with one embodiment of the invention.
Figure 6B:
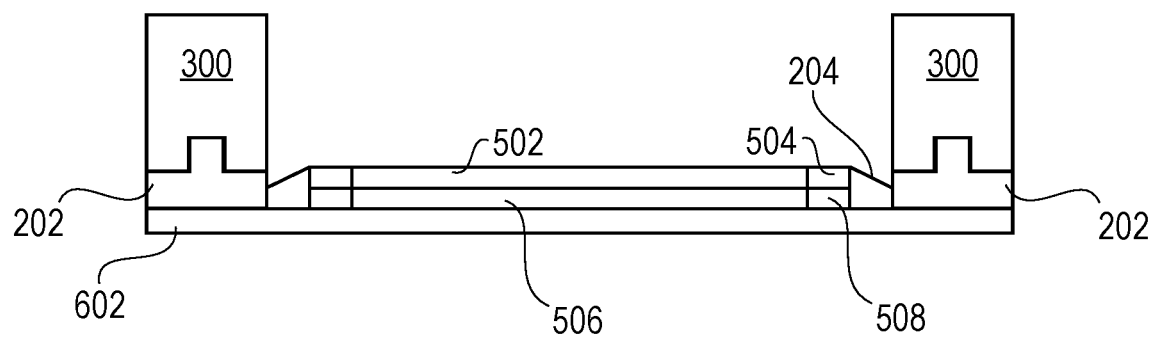

FIGS. 6A and 6B depict cross-sectional views of components of a 3D printing system so as to describe a process to assemble the 3D printing system. FIGS. 6A and 6B depict a tank assembly 600 (comprising tank sidewall 300 and membrane assembly 200) being affixed to a lighting assembly 601 (comprising glass plate 502, frame 504, LCD 506, frame 508 and base portion 602). At least one of LCD 506 or frame 508 may be supported on base portion 602. It is noted that glass plate 502 is an optional component and some embodiments (as described below) may not include glass plate 502. In one embodiment, the clearance between membrane 204 and base portion 602 may be less than the combined height of glass plate 502 and LCD 506. As such, when tank assembly 600 is affixed to lighting assembly 601, glass plate 502 may displace a portion of membrane 204 away from a first plane and into a second plane parallel to the first plane. The first plane may define a region in which membrane 204 is disposed prior to tank assembly 600 being affixed to lighting assembly 601, and may also be called the "rest plane" of membrane 204.

Figure 6C:
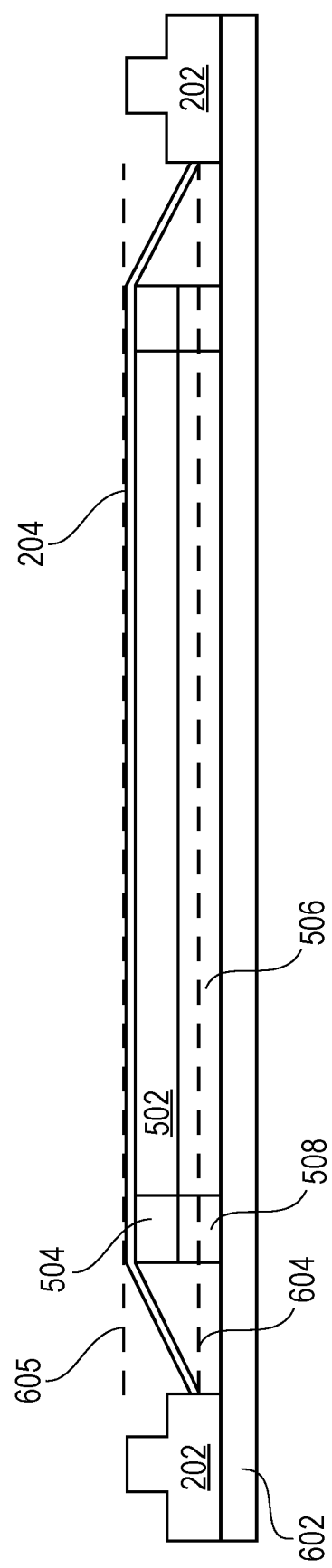
FIG. 6C depicts an enlarged cross-sectional view showing a portion of the membrane displaced from its rest plane, in accordance with one embodiment of the invention.

FIG. 6C depicts an enlarged cross-sectional view showing a portion of membrane 204 being disposed in plane 605, having been displaced from plane 604 into plane 605 by glass panel 502 and/or frame 504. The displacement in membrane 204 may increase a tension of membrane 204, which may be advantageous for the 3D printing system, as described below in FIGS. 7D and 7E. It is noted that for the embodiment depicted in FIGS. 6A-6C, it is important for the dimensions (i.e., length and width) of frames 504 and 508 to be smaller than the dimensions (i.e., length and width) of frame 202, so that frames 504 and 508 can be inserted into the region surrounded by frame 202.

Figure 6D:
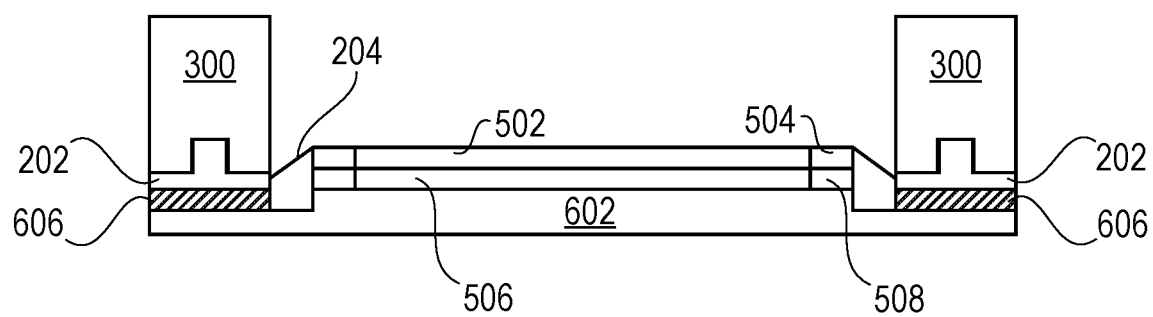
FIG. 6D depicts a cross-sectional view of a 3D printing system with a height adjustment mechanism configured to adjust the position of the membrane with respect to its rest plane, in accordance with one embodiment of the invention.

FIG. 6D depicts a cross-sectional view of a 3D printing system with height adjustment mechanism 606 disposed between frame 202 and base portion 602. Height adjustment mechanism 606 may be configured to adjust a vertical position of frame 202 with respect to base portion 602, and in turn adjust the displacement of the portion of membrane 204 with respect to plane 604 (i.e., plane 604 depicted in FIG. 6C). Height adjustment mechanism 606 may include one or more of posts, rails, tracks, stepper motors, piezo transducers, or other means. It is noted that height adjustment mechanism 606 may also be called a "tension adjustment mechanism", as adjusting the displacement of membrane 204 has the associated effect of adjusting the tension of membrane 204.

Figure 6E:
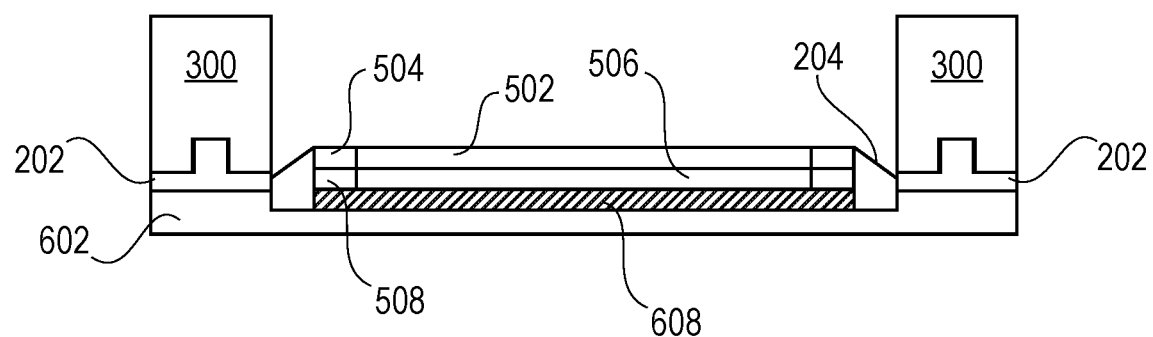
FIG. 6E depicts a cross-sectional view of a 3D printing system with an alternative and/or additional height adjustment mechanism configured to adjust the position of the membrane with respect to its rest plane, in accordance with one embodiment of the invention.
Figure 6F:
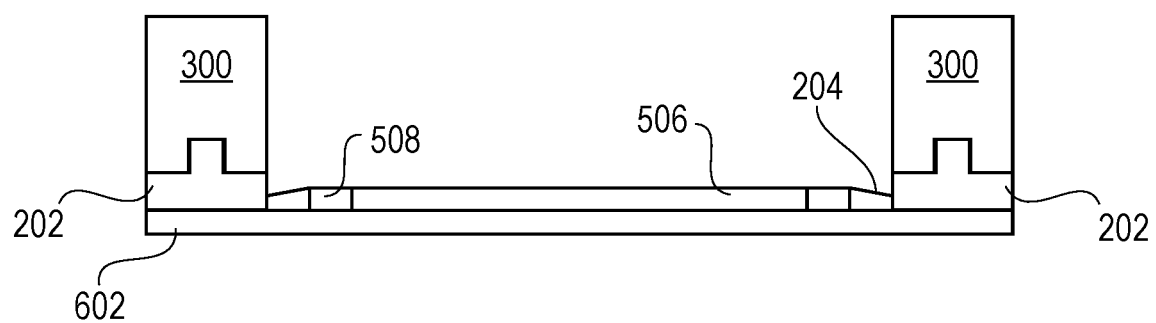
FIG. 6F depicts a cross-sectional view of a 3D printing system without the optional glass plate between the membrane and the LCD, in accordance with one embodiment of the invention.

FIG. 6E depicts a cross-sectional view of a 3D printing system with height adjustment mechanism 608 disposed between base portion 602 and at least one of LCD 506 or frame 508. Height adjustment mechanism 608 may be configured to adjust a vertical position of LCD 506 with respect to base portion 602, and in turn adjust the displacement of the portion of membrane 204 with respect to plane 604 (i.e., plane 604 depicted in FIG. 6C). Similarly, height adjustment mechanism 608 may be called a "tension adjustment mechanism". FIG. 6F depicts a cross-sectional view of a 3D printing system without the optional glass plate 502 between membrane 204 and LCD panel 506, in accordance with one embodiment of the invention. The clearance between membrane 204 and base portion 602 may be less than the height of LCD 506, similarly causing LCD 506 (or frame 508) to displace membrane 204 from a first plane into a second plane, and increasing the tension of membrane 204. It is noted that for the embodiment depicted in FIG. 6F, it is likewise important for the dimensions (i.e., length and width) of frame 508 to be smaller than the dimensions (i.e., length and width) of frame 202, so that frame 508 can be inserted into the region surrounded by frame 202.

Figure 6G:
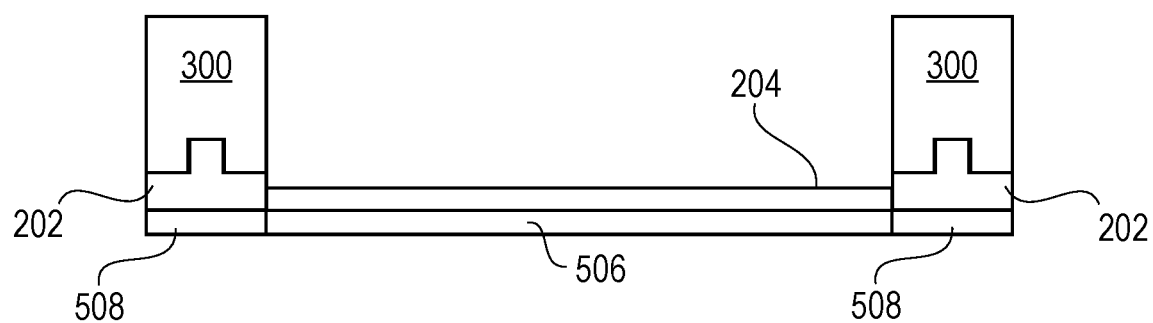
FIG. 6G depicts a cross-sectional view of a 3D printing system without displacement in the membrane, in accordance with one embodiment of the invention.

FIG. 6G depicts a cross-sectional view of an embodiment of a 3D printing system without displacement in membrane 204, in accordance with one embodiment of the invention. In FIG. 6G, the dimensions of frame 508 (i.e., frame securing LCD 506) are similar to the dimensions of frame 202 (i.e., frame securing membrane 204) so that frame 202 rests upon frame 508. Neither frame 508 nor LCD 506 displace membrane 204 in the embodiment of FIG. 6G.

Figure 6H:
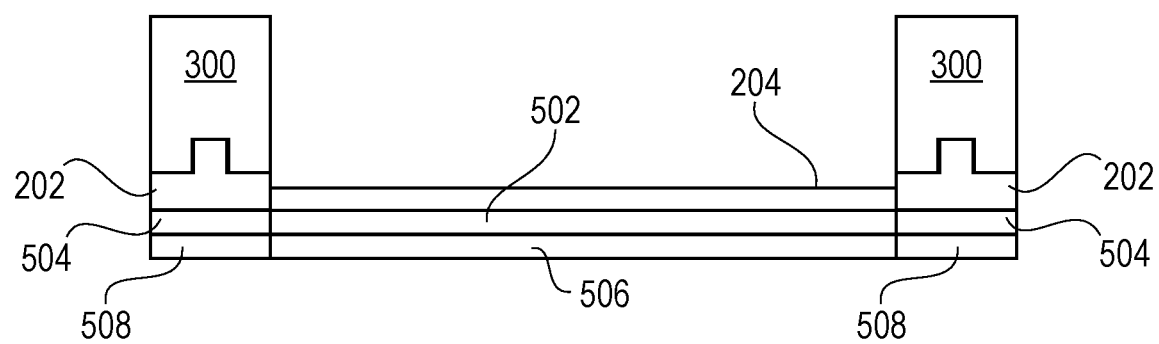
FIG. 6H depicts a cross-sectional view of another 3D printing system without displacement in the membrane, in accordance with one embodiment of the invention.

FIG. 6H depicts a cross-sectional view of another embodiment of a 3D printing system without displacement in membrane 204. In FIG. 6H, the dimensions of frame 508 (i.e., frame securing LCD 506) and frame 504 (i.e., frame securing glass plate 502) are similar to the dimensions of frame 202 (i.e., frame securing membrane 204) so that frame 202 rests upon frame 504 and frame 504 rests upon frame 508. Neither frame 504 nor glass 502 displace membrane 204 in the embodiment of FIG. 6H.

Figure 7A:
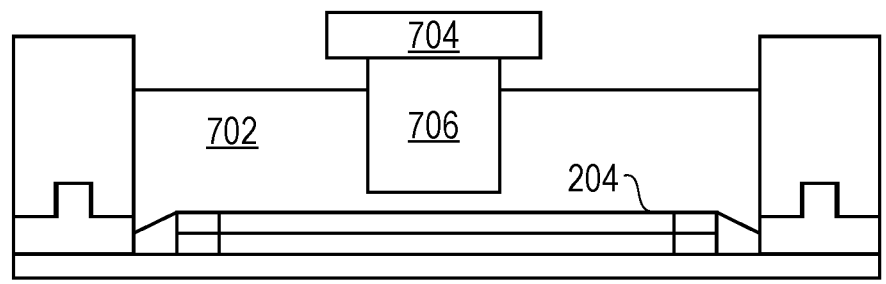
FIGS. 7A-7C depict cross-sectional views of a 3D printing system during a 3D printing process, in accordance with one embodiment of the invention.
Figure 7B:
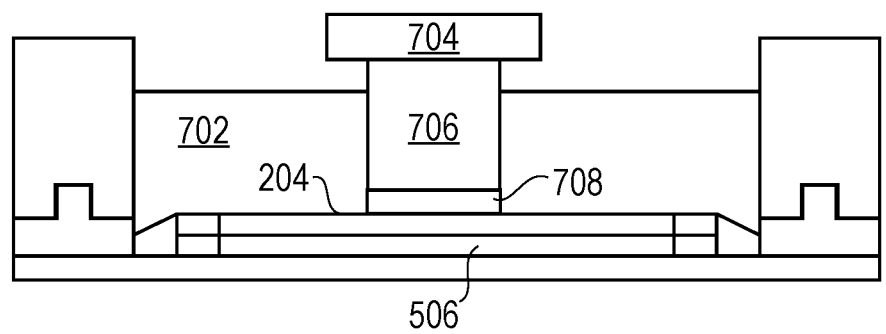
Figure 7C:
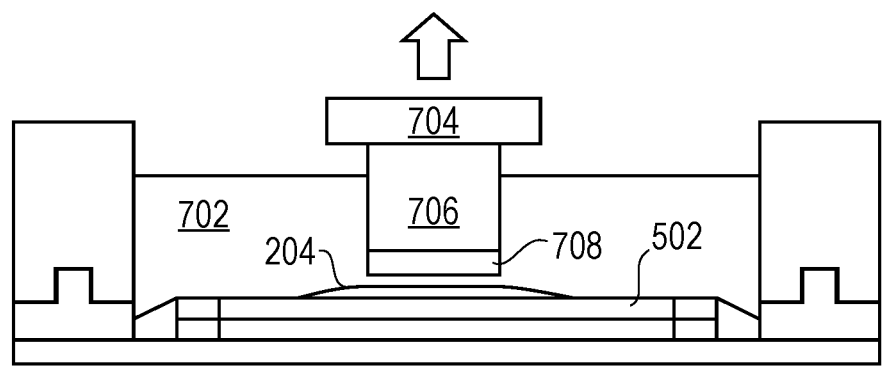
Figure 7D:
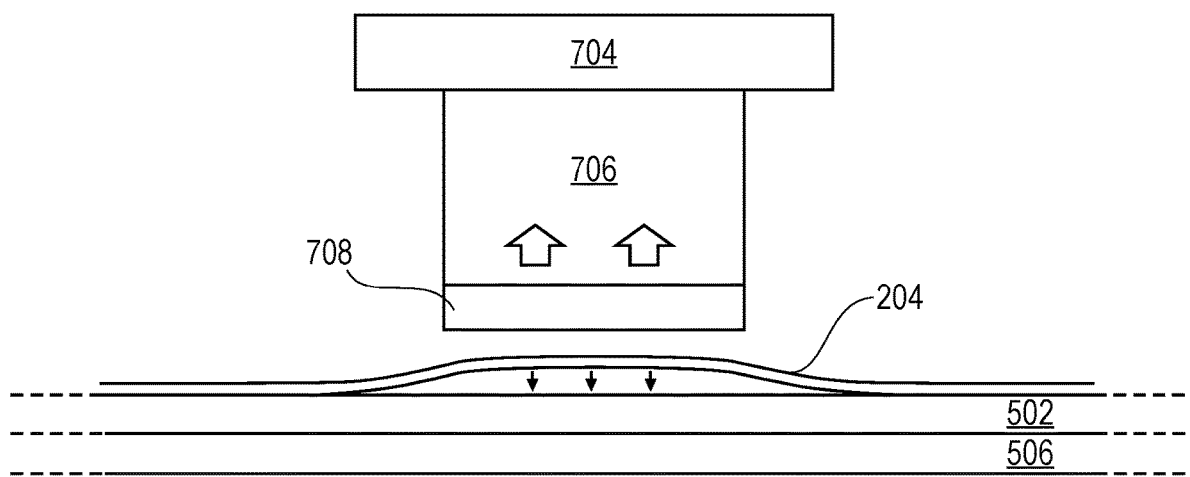
FIG. 7D shows an enlarged view of FIG. 7C, depicting the membrane being displaced due to the vertical translation of the partially formed object, in accordance with one embodiment of the invention.
Figure 7E:
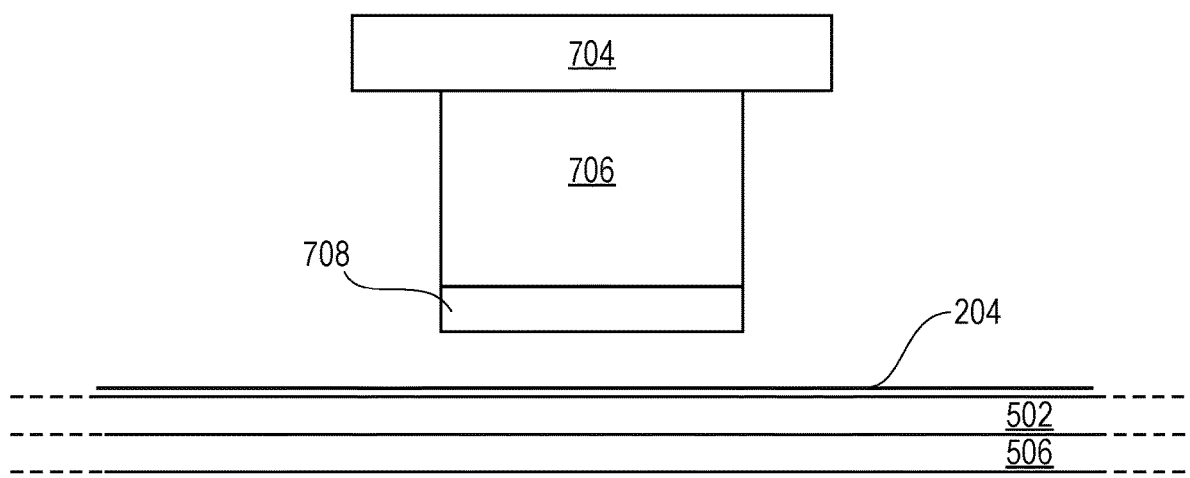
FIG. 7E depicts a state of the membrane shortly after the illustration of FIG. 7D, in which the membrane has relaxed back onto the surface of the glass plate, in accordance with one embodiment of the invention.

FIGS. 7A-7C depict cross-sectional views of a 3D printing system during a 3D printing process. In FIG. 7A, photo-curing liquid resin 702 is contained within the tank assembly. Partially formed object 706 is secured to extraction plate 704. Subsequent to FIG. 7A and prior to FIG. 7B, radiation is emitted from LCD 506 which forms an image in the region between the partially formed object 706 and membrane 204. The image selectively cures resin 702 and forms a new layer 708 of partially formed object 706, as depicted in FIG. 7B. FIG. 7C depicts extraction plate 704 being raised vertically by a height adjusting means (not depicted), causing partially formed object 706 (along with new layer 708) to be lifted within resin 702. At least initially, new layer 708 may partially adhere to membrane 204 so that when new layer 708 is raised by extraction plate 704, membrane 204 may be pulled (slightly) away from the surface of glass plate 502. FIG. 7D shows an enlarged view of FIG. 7C. The small downward arrows in FIG. 7D represent the reflexive force that draws membrane 204 back towards glass plate 502. As mentioned earlier, displacement of membrane 204 by glass plate 502 (i.e., away from the rest plane of membrane 204) increases the tension on membrane 204. The increased tension beneficially increases the reflexive force and decreases the time taken by membrane 204 to reach the state depicted in FIG. 7E, in which the membrane is once again disposed on the surface of glass plate 502.

Figure 8A:
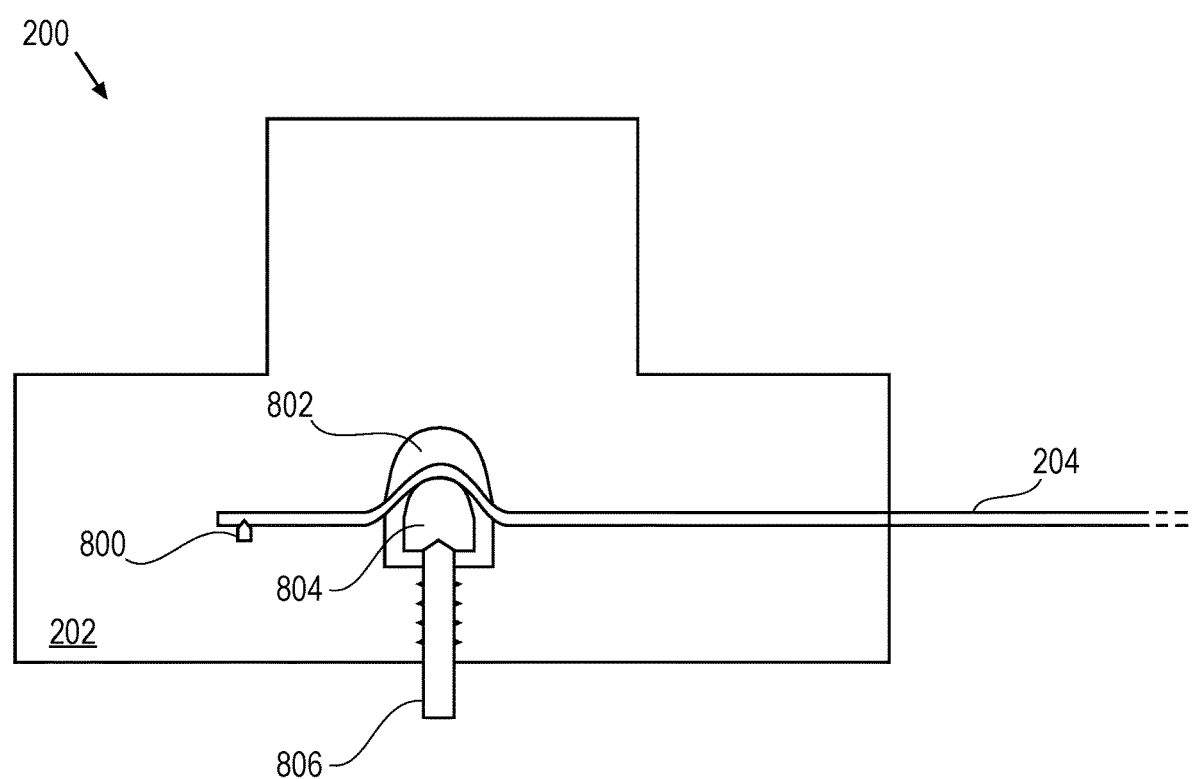
FIG. 8A depicts a cross-sectional view of a portion of the membrane assembly that shows a tension adjustment mechanism, in accordance with one embodiment of the invention.

FIG. 8A depicts a cross-sectional view of a portion of membrane assembly 200, that shows tension adjustment mechanism 804, 806 embedded within the membrane assembly 200. Anchor 800 may be used to anchor a perimeter of membrane 204 in a stationary manner with respect to frame 202. Cavity 802 within membrane frame 202 allows for displacement of membrane 204 (as drawn in FIG. 8A, displacement in the direction perpendicular to a plane in which membrane 204 extends). Membrane engagement member 804 may be configured to impart a force onto the surface of membrane 204 so as to increase or decrease a tension of membrane 204. Screw 806 may abut against membrane engagement member 804. The turning of screw 806 about an axis of the screw may adjust a position of membrane engagement member 804 with respect to frame 202 and in turn adjust the tension of membrane 204. Elements 804 and 806 are only one embodiment of a tension adjustment means and it is understood that other tension adjustment means are possible, such as a mechanism that adjusts the force imparted on membrane 204 in a direction parallel to the plane in which membrane 204 lies.

Figure 8B:
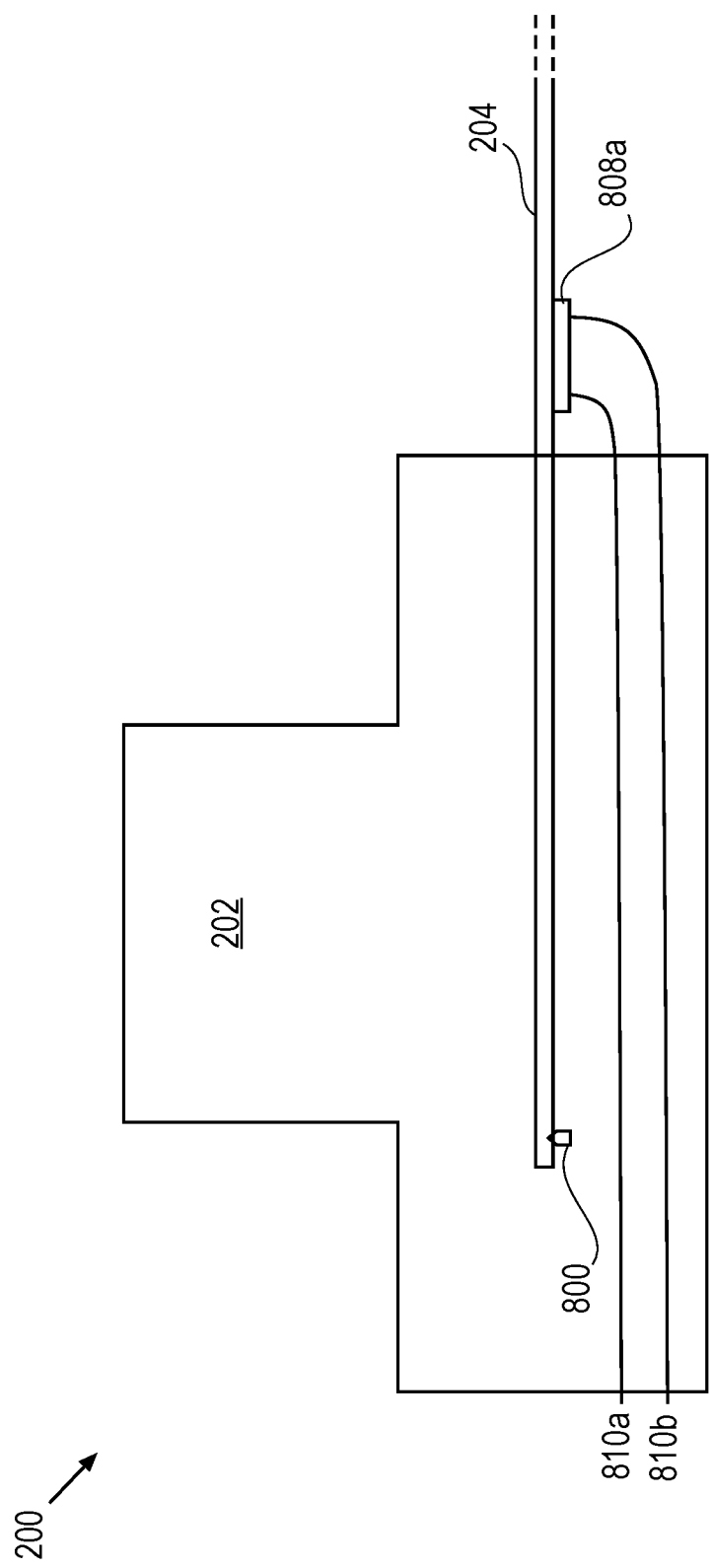
FIG. 8B depicts a cross-sectional view of a portion of the membrane assembly that shows a tension sensor, in accordance with one embodiment of the invention.

FIG. 8B depicts a cross-sectional view of a portion of membrane assembly 200 that shows tension sensor 808a (for measuring a tension of the membrane) affixed to a surface of membrane 204. More specifically, tension sensor 808a may be affixed to a bottom surface of membrane 204 so that tension sensor 808a is not exposed to the resin which contacts the top surface of membrane 204 (i.e., when the 3D printing system is in use). Furthermore, tension sensor 808a may be located in a region of membrane 204 that does not block radiation from LCD 506 (i.e., in the peripheral regions). Electrical wires 810a and 810b may be electrically connected to tension sensor 808a so as to allow measurement of the membrane tension at a location remote from membrane 204. In one embodiment, tension sensor 808a may comprise a strain gauge with a meandering structure that is affixed to the surface of membrane 204. While not depicted, wire 810 may be communicatively coupled to a display (where the tension level may be displayed to a human operator), or to a controller (such as controller 126).

A feedback control algorithm may be employed by controller 126. For example, controller 126 may measure the tension of membrane 204 using tension sensor 808a, compare the measured tension to a desired tension value, provide control signals to height adjustment mechanism 606, 608 or tension adjustment mechanism 804, 806 so as to adjust the tension of membrane 204, measure the new tension of membrane 204 using tension sensor 808a, and so on until the desired tension value is reached (within some defined tolerance limit).

Figure 8C:
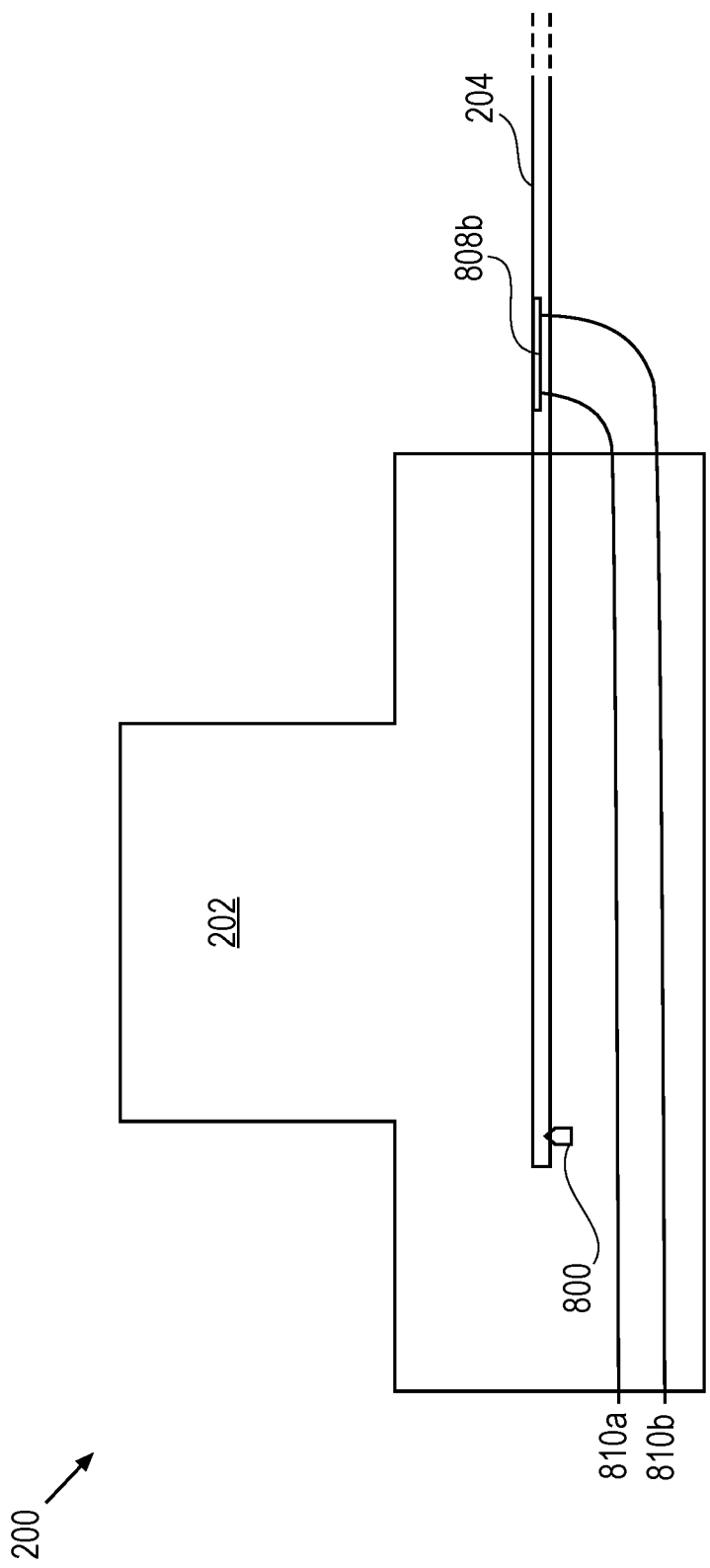
FIG. 8C depicts a cross-sectional view of a portion of the membrane assembly that shows an alternative or additional tension sensor, in accordance with one embodiment of the invention.

FIG. 8C depicts a cross-sectional view of a portion of membrane assembly 200 that shows an alternative or additional tension sensor 808b (for measuring a tension of the membrane) embedded within membrane 204. Like tension sensor 808a, tension sensor 808a may be located in a region of membrane 204 that does not block radiation from LCD 506 (i.e., in the peripheral regions). Electrical wires 810a and 810b may be electrically connected to tension sensor 808b so as to allow measurement of the membrane tension at a location remote from membrane 204. In one embodiment, tension sensor 808b may be a conductive strip. Stretching or a relaxation of membrane 204 may strain or deform the conductive strip and alter an electrical current flowing through the conductive strip. In turn, a measurement of the electrical current may be mapped or converted into a tension value of membrane 204.

Figure 8D:
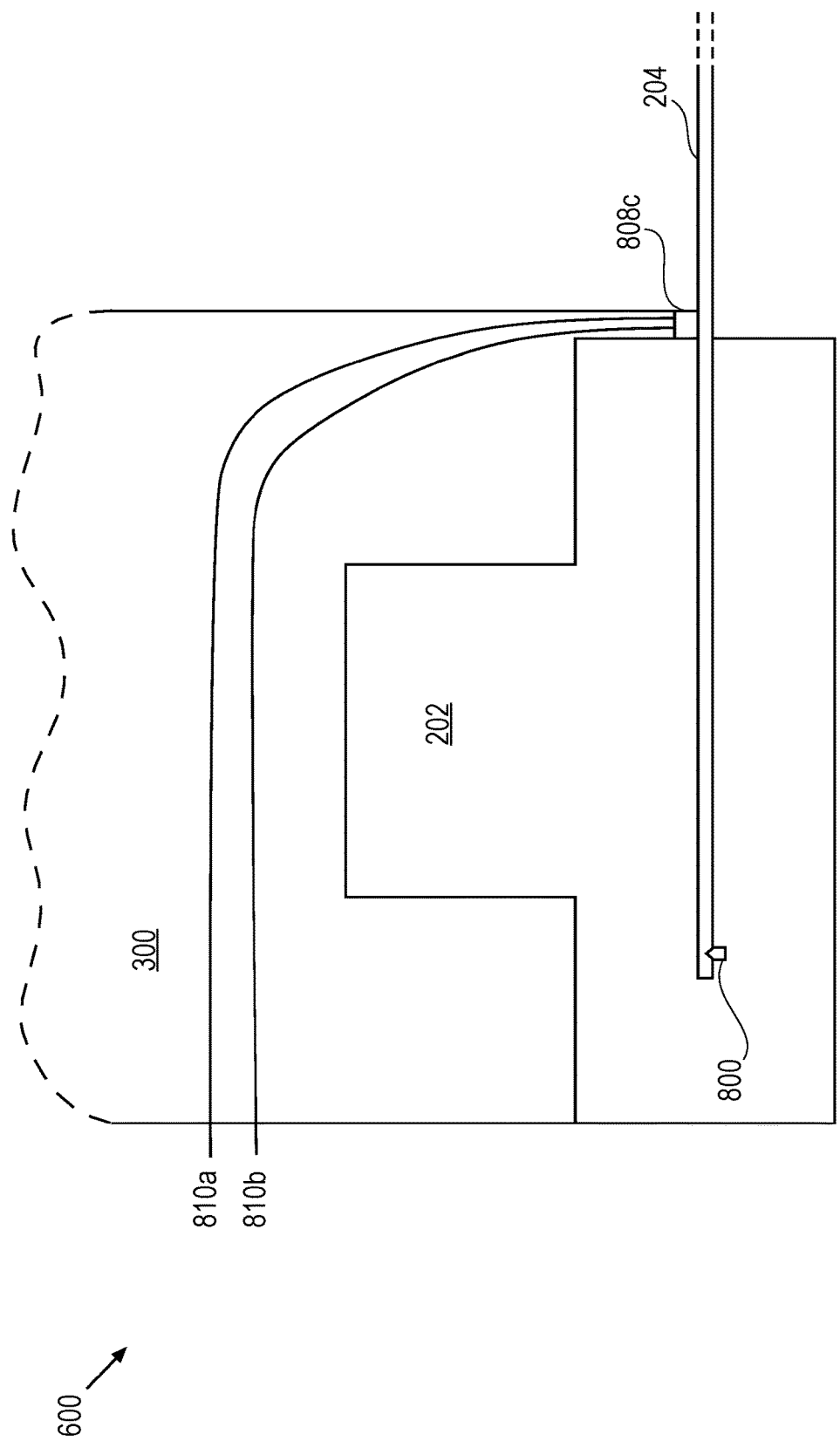
FIG. 8D depicts a cross-sectional view of a portion of a tank assembly that shows an alternative or additional tension sensor, in accordance with one embodiment of the invention.

FIG. 8D depicts a cross-sectional view of a portion of tank assembly 600 that shows an alternative or additional tension sensor 808c coupled to tank sidewall 300. Tension sensor 808c may be configured to detect a movement of membrane 204 upon loss of tension of membrane 204 (e.g., when a tear develops in membrane 204). One advantage of tension sensor 808c being coupled to (or integrated with) tank sidewall 300 instead of to membrane assembly 200 (as described in FIGS. 8B and 8C) is that tension sensor 808c is located on a "permanent" component, as opposed to the "consumable" membrane assembly 200. Tension sensor 808c may only be infrequently replaced whenever it reaches its useful lifetime, whereas tension sensors 808a, 808b may be replaced whenever membrane assembly 200 is replaced. In other words, tension sensors of membrane assembly 200 may be replaced not due to necessity, but replaced because the entire membrane assembly is being replaced.

While one or more of tension sensors 808a, 808b, 808c may be used to calibrate the tension of membrane 204, other calibration routines may be employed that do not require the use of tension sensors. For example, cameras or other imaging equipment may be used to evaluate a test structure (e.g., with various geometries—lines, holes, planes, etc.) under construction in tank assembly 600. Images from the cameras may be compared against prestored images of a properly fabricated test structure (or a computer rendering of a simulated version of the test structure). Variations like non-uniform edges, holes that are not fully open, etc. may be identified in the test structure under fabrication, and the tension of membrane 204 may be adjusted in response thereto (using one or more of the above-described tension adjustment mechanisms) until the test structure comports with the desired geometries within some tolerance level.

In one embodiment, a plurality of tension sensors may be located on different portions of membrane 204 to obtain different "local" readings. The local readings may then be combined to arrive at one "global" estimate of the membrane tension. In one embodiment, an average of the local readings may be computed, while in another embodiment, a linear combination of the local readings may be computed (e.g., using different calibration weights for each tension sensor).

Figure 9:
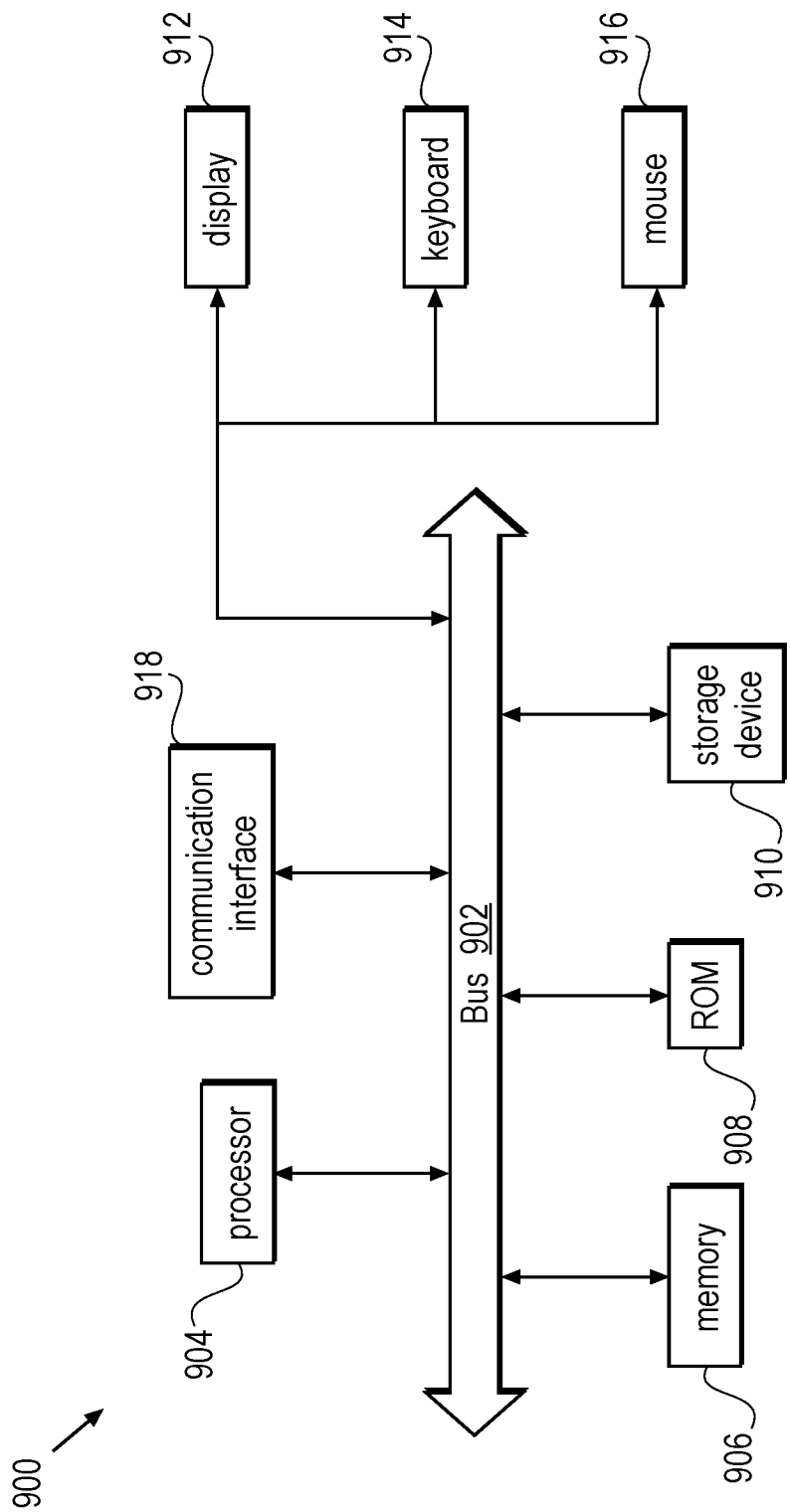
FIG. 9 depicts components of a computer system in which computer readable instructions instantiating the methods of the present invention may be stored and executed.

As is apparent from the foregoing discussion, aspects of the present invention involve the use of various computer systems and computer readable storage media having computer-readable instructions stored thereon. FIG. 9 provides an example of a system 900 that may be representative of any of the computing systems (e.g., controller 126) discussed herein. Examples of system 900 may include a smartphone, a desktop, a laptop, a mainframe computer, an embedded system, etc. Note, not all of the various computer systems have all of the features of system 900. For example, certain ones of the computer systems discussed above may not include a display inasmuch as the display function may be provided by a client computer communicatively coupled to the computer system or a display function may be unnecessary. Such details are not critical to the present invention.

System 900 includes a bus 902 or other communication mechanism for communicating information, and a processor 904 coupled with the bus 902 for processing information. Computer system 900 also includes a main memory 906, such as a random access memory (RAM) or other dynamic storage device, coupled to the bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to the bus 902 for storing static information and instructions for the processor 904. A storage device 910, for example a hard disk, flash memory-based storage medium, or other storage medium from which processor 904 can read, is provided and coupled to the bus 902 for storing information and instructions (e.g., operating systems, applications programs and the like).

Computer system 900 may be coupled via the bus 902 to a display 912, such as a flat panel display, for displaying information to a computer user. An input device 914, such as a keyboard including alphanumeric and other keys, may be coupled to the bus 902 for communicating information and command selections to the processor 904. Another type of user input device is cursor control device 916, such as a mouse, a trackpad, or similar input device for communicating direction information and command selections to processor 904 and for controlling cursor movement on the display 912. Other user interface devices, such as microphones, speakers, etc. are not shown in detail but may be involved with the receipt of user input and/or presentation of output.

The processes referred to herein may be implemented by processor 904 executing appropriate sequences of computer-readable instructions contained in main memory 906. Such instructions may be read into main memory 906 from another computer-readable medium, such as storage device 910, and execution of the sequences of instructions contained in the main memory 906 causes the processor 904 to perform the associated actions. In alternative embodiments, hard-wired circuitry or firmware-controlled processing units may be used in place of or in combination with processor 904 and its associated computer software instructions to implement the invention. The computer-readable instructions may be rendered in any computer language.

In general, all of the above process descriptions are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying", "receiving", "transmitting" or the like, refer to the action and processes of an appropriately programmed computer system, such as computer system 900 or similar electronic computing device, that manipulates and transforms data represented as physical (electronic) quantities within its registers and memories into other data similarly represented as physical quantities within its memories or registers or other such information storage, transmission or display devices.

Computer system 900 also includes a communication interface 918 coupled to the bus 902. Communication interface 918 may provide a two-way data communication channel with a computer network, which provides connectivity to and among the various computer systems discussed above. For example, communication interface 918 may be a local area network (LAN) card to provide a data communication connection to a compatible LAN, which itself is communicatively coupled to the Internet through one or more Internet service provider networks. The precise details of such communication paths are not critical to the present invention. What is important is that computer system 900 can send and receive messages and data through the communication interface 918 and in that way communicate with hosts accessible via the Internet. It is noted that the components of system 900 may be located in a single device or located in a plurality of physically and/or geographically distributed devices.

Thus, a three-dimensional printing system has been described. It is to be understood that the above-description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A tank assembly, comprising:
a tank sidewall, wherein a bottom rim of the tank sidewall comprises a groove;
a tension sensor coupled to the tank sidewall;
a radiation-transparent flexible membrane; and
a frame secured to a perimeter of the radiation-transparent flexible membrane,
wherein the frame comprises a lip that engages with the groove of the bottom rim of the tank sidewall, and wherein the tension sensor is configured to detect a movement of the radiation-transparent flexible membrane upon a loss of tension of the radiation-transparent flexible membrane.

2. The tank assembly of claim 1, wherein the frame is configured to stretch the radiation-transparent flexible membrane along a first plane, wherein the frame comprises a top planar surface that extends parallel to the first plane, a bottom planar surface that extends parallel to the first plane, and wherein the perimeter of the radiation-transparent flexible membrane is secured to a portion of the frame between the top and bottom planar surfaces of the frame.

3. A three-dimensional (3D) printing system, comprising:
a tank assembly comprising:
a tank sidewall, wherein a bottom rim of the tank sidewall comprises a groove;
a radiation-transparent flexible membrane; and
a first frame secured to a perimeter of the radiation-transparent flexible membrane, wherein the first frame comprises a lip that engages with the groove of the bottom rim of the tank sidewall;
a lighting assembly comprising:
a glass plate secured within a second frame; and
a liquid crystal display (LCD) secured within a third frame, wherein the second frame is secured to the third frame, wherein the second frame is configured to displace a portion of the radiation-transparent flexible membrane away from a first plane into a second plane parallel to the first plane, and wherein the first plane defines a region in which the radiation-transparent flexible membrane lies absent the displacement of the portion of the radiation-transparent flexible membrane by the second frame;
a base portion configured to support at least one of the third frame or the LCD; and
a height adjustment mechanism disposed between the first frame and the base portion, the height adjustment mechanism configured to adjust a vertical position of the first frame with respect to the base portion, and in turn adjust the displacement of the portion of the radiation-transparent flexible membrane with respect to the first plane.

4. The 3D printing system of claim 3, further comprising a tension adjustment mechanism coupled to the radiation-transparent flexible membrane and configured to adjust a tension of the radiation-transparent flexible membrane.

5. The 3D printing system of claim 3, further comprising a tension sensor affixed to a surface of the radiation-transparent flexible membrane and configured to measure a tension of the radiation-transparent flexible membrane.

6. The 3D printing system of claim 5, wherein the tension sensor comprises a strain gauge affixed to the surface of the radiation-transparent flexible membrane.

7. The 3D printing system of claim 3, further comprising a tension sensor embedded within the radiation-transparent flexible membrane and configured to measure a tension of the radiation-transparent flexible membrane.

8. A three-dimensional (3D) printing system, comprising:
a tank assembly comprising:
a tank sidewall, wherein a bottom rim of the tank sidewall comprises a groove;
a radiation-transparent flexible membrane; and
a first frame secured to a perimeter of the radiation-transparent flexible membrane, wherein the first frame comprises a lip that engages with the groove of the bottom rim of the tank sidewall;
a lighting assembly comprising:

a glass plate secured within a second frame; and a liquid crystal display (LCD) secured within a third frame, wherein the second frame is secured to the third frame, wherein the second frame is configured to displace a portion of the radiation-transparent flexible membrane away from a first plane into a second plane parallel to the first plane, and wherein the first plane defines a region in which the radiation-transparent flexible membrane lies absent the displacement of the portion of the radiation-transparent flexible membrane by the second frame;

a base portion configured to support the first frame; and a height adjustment mechanism disposed between the base portion and at least one of the third frame or the LCD, the height adjustment mechanism configured to adjust a vertical position of the LCD with respect to the base portion, and in turn adjust the displacement of the portion of the radiation-transparent flexible membrane with respect to the first plane.

9. The 3D printing system of claim 7, wherein the tension sensor comprises a conductive strip.

10. The 3D printing system of claim 8, further comprising a tension adjustment mechanism coupled to the radiation-transparent flexible membrane and configured to adjust a tension of the radiation-transparent flexible membrane.

11. The 3D printing system of claim 8, further comprising a tension sensor affixed to a surface of the radiation-transparent flexible membrane and configured to measure a tension of the radiation-transparent flexible membrane.

12. The 3D printing system of claim 11, wherein the tension sensor comprises a strain gauge affixed to the surface of the radiation-transparent flexible membrane.

13. The 3D printing system of claim 8, further comprising a tension sensor embedded within the radiation-transparent flexible membrane and configured to measure a tension of the radiation-transparent flexible membrane.

14. The 3D printing system of claim 13, wherein the tension sensor comprises a conductive strip.

15. A three-dimensional (3D) printing system, comprising:

a tank assembly comprising:

a tank sidewall, wherein a bottom rim of the tank sidewall comprises a groove;

a radiation-transparent flexible membrane; and a first frame secured to a perimeter of the radiation-transparent flexible membrane and configured to stretch the radiation-transparent flexible membrane along a first plane, wherein the first frame comprises a top planar surface that extends parallel to the first plane, a bottom planar surface that extends parallel to the first plane, and a lip extending from the top planar surface in a direction perpendicular to the first plane, wherein the perimeter of the radiation-transparent flexible membrane is secured to a portion of the first frame between the top and bottom planar surfaces of the first frame, and wherein the lip engages with the groove of the bottom rim of the tank sidewall; and a liquid crystal display (LCD) secured within a second frame, wherein the second frame is configured to displace a portion of the radiation-transparent flexible membrane away from the first plane into a second plane parallel to the first plane, wherein the first plane defines a region in which the radiation-transparent flexible membrane lies absent the displacement of the portion of the radiation-transparent flexible membrane by the second frame.

16. The 3D printing system of claim 15, further comprising a tension adjustment mechanism coupled to the radiation-transparent flexible membrane and configured to adjust a tension of the radiation-transparent flexible membrane.

17. The 3D printing system of claim 15, further comprising a tension sensor affixed to a surface of the radiation-transparent flexible membrane and configured to measure a tension of the radiation-transparent flexible membrane.

18. The 3D printing system of claim 17, wherein the tension sensor comprises a strain gauge affixed to the surface of the radiation-transparent flexible membrane.

19. The 3D printing system of claim 15, further comprising a tension sensor embedded within the radiation-transparent flexible membrane and configured to measure a tension of the radiation-transparent flexible membrane.

20. The 3D printing system of claim 19, wherein the tension sensor comprises a conductive strip.

* * * * *